(12) United States Patent
Ido

(10) Patent No.: US 9,265,120 B2
(45) Date of Patent: Feb. 16, 2016

(54) LIGHTING DEVICE AND LUMINAIRE USING SAME

(71) Applicant: Panasonic Intellectual Property Management Co., Ltd., Osaka (JP)

(72) Inventor: Shigeru Ido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/428,712

(22) PCT Filed: Oct. 24, 2013

(86) PCT No.: PCT/JP2013/006281
§ 371 (c)(1),
(2) Date: Mar. 17, 2015

(87) PCT Pub. No.: WO2014/068910
PCT Pub. Date: May 8, 2014

(65) Prior Publication Data
US 2015/0250037 A1    Sep. 3, 2015

(30) Foreign Application Priority Data

Oct. 29, 2012  (JP) ................................. 2012-238038

(51) Int. Cl.
*H05B 33/08*    (2006.01)

(52) U.S. Cl.
CPC .......... *H05B 33/0887* (2013.01); *H05B 33/089* (2013.01); *H05B 33/0815* (2013.01); *H05B 33/0896* (2013.01); *Y02B 20/341* (2013.01); *Y02B 20/346* (2013.01)

(58) Field of Classification Search
None
See application file for complete search history.

(56) References Cited

U.S. PATENT DOCUMENTS

| 2007/0057936 A1 | 3/2007 | Lee et al. |
| 2008/0094000 A1 | 4/2008 | Yamamoto et al. |
| 2010/0090604 A1 | 4/2010 | Maruyama et al. |
| 2011/0260617 A1 | 10/2011 | Tanaka |

(Continued)

FOREIGN PATENT DOCUMENTS

| JP | 2007-096296 A | 4/2007 |
| JP | 2008-059811 A | 3/2008 |

(Continued)

OTHER PUBLICATIONS

International Search Report for corresponding International Application No. PCT/JP2013/006281 mailed Jan. 28, 2014.

(Continued)

*Primary Examiner* — Douglas W Owens
*Assistant Examiner* — Dedei K Hammond
(74) *Attorney, Agent, or Firm* — Renner, Otto, Boisselle & Sklar, LLP

(57) ABSTRACT

A lighting device includes a step-down circuit configured to convert an input voltage into a DC voltage by no insulation, and a control circuit configured to control the step-down circuit. The step-down circuit has an input end, and the step-down circuit is provided on a side of the input end with an overcurrent protector. The overcurrent protector is configured to be fused by flowing of an overcurrent. The step-down circuit has an output end, a side of which is connected in parallel with a switching circuit. The switching circuit includes a switching element. The control circuit is configured to turn on the switching element according to an output voltage of the step-down circuit.

11 Claims, 16 Drawing Sheets

(56) References Cited

U.S. PATENT DOCUMENTS

2012/0200230 A1* 8/2012 Esaki ............ H05B 33/0851 315/200 R
2013/0026946 A1 1/2013 Maruyama et al.

FOREIGN PATENT DOCUMENTS

| | | |
|---|---|---|
| JP | 2010-092776 A | 4/2010 |
| JP | 2011-171238 A | 9/2011 |
| JP | 2011-233264 A | 11/2011 |
| JP | 2011-249377 A | 12/2011 |
| JP | 2012-054181 A | 3/2012 |
| JP | 2012-094424 A | 5/2012 |

OTHER PUBLICATIONS

Form PCT/ISA/237 for corresponding International Application No. PCT/JP2013/006281 dated Jan. 28, 2014.

* cited by examiner

LIGHTING DEVICE AND LUMINAIRE USING SAME

TECHNICAL FIELD

The invention relates to a lighting device, and a luminaire using the same.

BACKGROUND ART

Conventionally, there has been proposed an LED lighting control device that relates to a lighting circuit of an LED luminaire with an LED element as a light source (e.g., JP 2011-171238 A (hereinafter, referred to as a "document 1")). In the document 1, the LED luminaire using the above mentioned LED lighting control device is described.

The LED luminaire in the document 1, as shown in FIG. 17, includes an LED light emitting portion 51, as a light source, which is provided with LED elements, and a lighting circuit portion 52 which is configured to turn on the LED light emitting portion 51.

The lighting circuit portion 52 includes a filter circuit 53, a full-wave rectifier 56, a boosting chopper circuit 54 and a non-insulated type step-down chopper circuit 55. Note that, the document 1 discloses that the filter circuit 53 is provided with a fuse (not shown).

The boosting chopper circuit 54 includes a capacitor C51, a choke coil L52, a switching element Q52, a resistor R51, a diode D52 and a capacitor C53.

The step-down chopper circuit 55 includes a control circuit IC3, a diode D51, a switching element Q51, a choke coil L51 and a capacitor C52. The capacitor C52 is connected in parallel with the LED light emitting portion 51.

The lighting circuit portion 52 of the above-mentioned LED luminaire includes, as a step-down circuit, the non-insulated type step-down chopper circuit 55. Accordingly, in the above-mentioned lighting circuit portion 52, if for example a short-circuit failure occurs at the switching element Q51 in a lighting state of the LED light emitting portion 51, a voltage boosted by the boosting chopper circuit 54 is applied to the LED light emitting portion 51. For this reason, in the lighting circuit portion 52, an overcurrent $I_s$ may flow along a path indicated by a broken line with an arrow in FIG. 17. Furthermore, in the lighting circuit portion 52, when the overcurrent $I_s$ flows through the LED light emitting portion 51, the LED light emitting portion 51 may fall into an overloaded state.

DISCLOSURE OF THE INVENTION

It is an object of the present invention to provide a lighting device, and a luminaire using the same, which can prevent a light source portion from falling into an overloaded state.

A lighting device according to an aspect of the present invention includes: a step-down circuit configured to convert an input voltage into a DC voltage by no insulation; and a control circuit configured to control the step-down circuit. The step-down circuit has an input end, and the step-down circuit is provided on a side of the input end with an overcurrent protector. The overcurrent protector is configured to be fused by flowing of an overcurrent. The step-down circuit has an output end, a side of which is connected in parallel with a switching circuit. The switching circuit includes a switching element. The control circuit is configured to turn on the switching element according to an output voltage of the step-down circuit.

In another aspect of the present invention, the switching circuit preferably further includes a current limiting element. The current limiting element is preferably connected in series with the switching element.

In another aspect of the present invention, the current limiting element is preferably an NTC thermistor.

In another aspect of the present invention, the switching element is preferably a thyristor.

In another aspect of the present invention, the lighting device is preferably configured so that a relationship of "$V_{in}/V_{out} > 0.5$" is satisfied, where $V_{in}$ denotes an effective value of a voltage input to the lighting device, and $V_{out}$ denotes the output voltage of the step-down circuit.

In another aspect of the present invention, the control circuit is preferably configured to turn on the switching element when the step-down circuit is in a stopped state.

In another aspect of the present invention, the step-down circuit is preferably further provided with a driving portion that is configured to turn on the switching element when the output voltage of the step-down circuit reaches a first prescribed voltage that is previously set.

In another aspect of the present invention, the step-down circuit is preferably further provided with a controlling portion that is configured not to allow operation of the switching circuit when the input voltage of the step-down circuit is equal to or less than a second prescribed voltage that is previously set.

In another aspect of the present invention, the step-down circuit is preferably further provided with an overcurrent detecting portion that is configured to detect the overcurrent. The step-down circuit is configured to turn on the switching element when the overcurrent is detected by the overcurrent detecting portion.

An LED luminaire according to an aspect of the present invention includes a light source portion with an LED element, and the lighting device.

An organic EL luminaire according to an aspect of the present invention includes a light source portion with an organic EL element, and the lighting device.

In the lighting device according to the aspect of the present invention, it is possible to prevent the light source portion from falling into an overloaded state.

In the luminaire according to the aspect of the present invention, it is possible to provide the luminaire including the lighting device which can prevent the light source portion from falling into the overloaded state.

BRIEF DESCRIPTION OF THE DRAWINGS

Preferred embodiments of the present invention will now be described in further details. Other features and advantages of the present invention will become better understood with regard to the following detailed description and accompanying drawings where.

BEST MODE FOR CARRYING OUT THE INVENTION

First Embodiment

Figure 1:
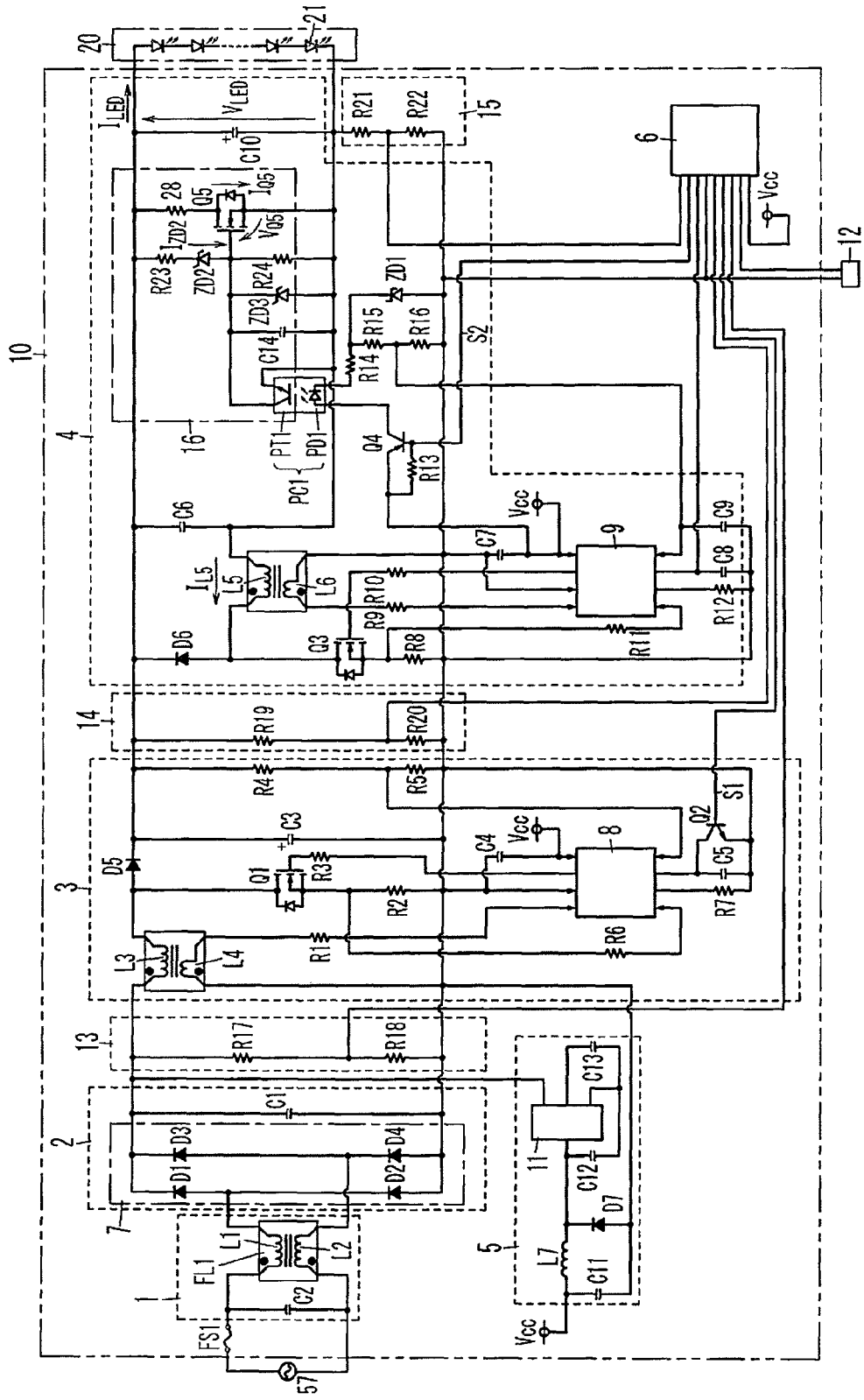
FIG. 1 is a circuit diagram illustrating a lighting device according to First Embodiment.
Figure 2:
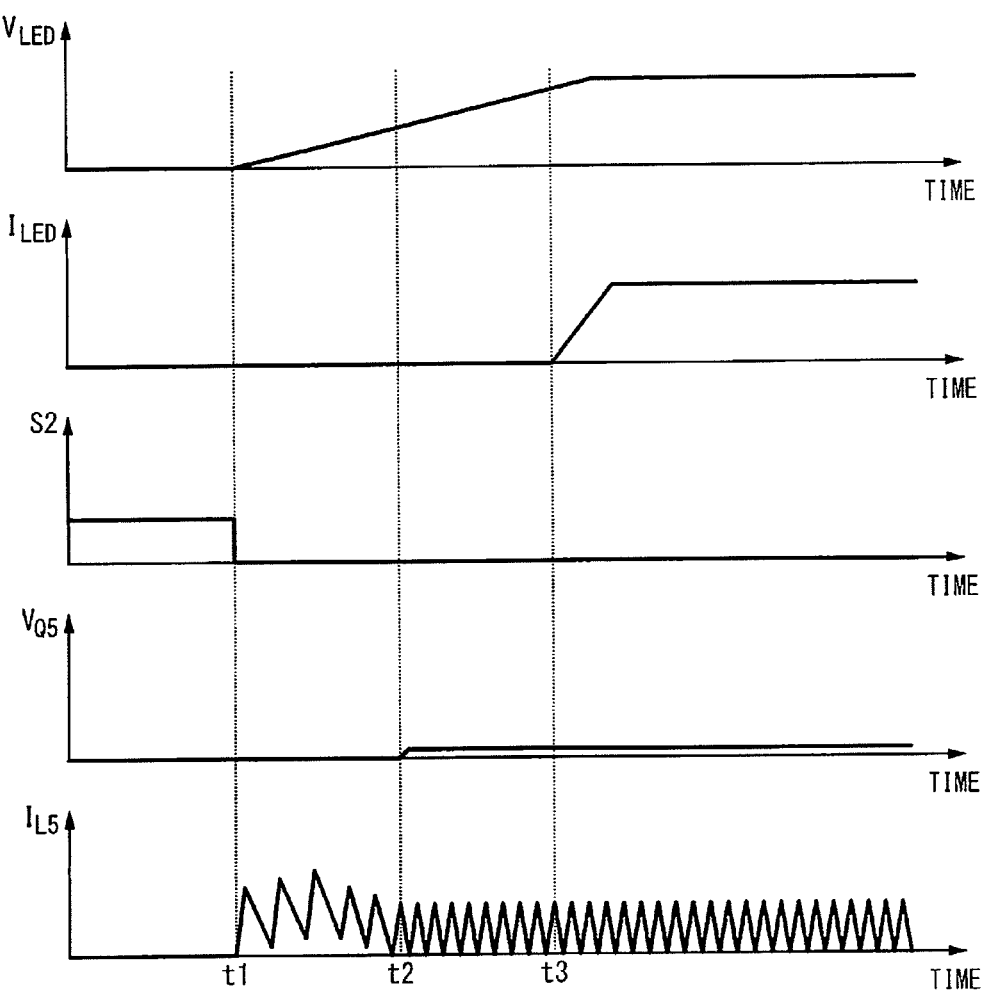
FIG. 2 is an explanatory drawing for operation when a light source portion is turned on, in the lighting device according to the First Embodiment.
Figure 3:
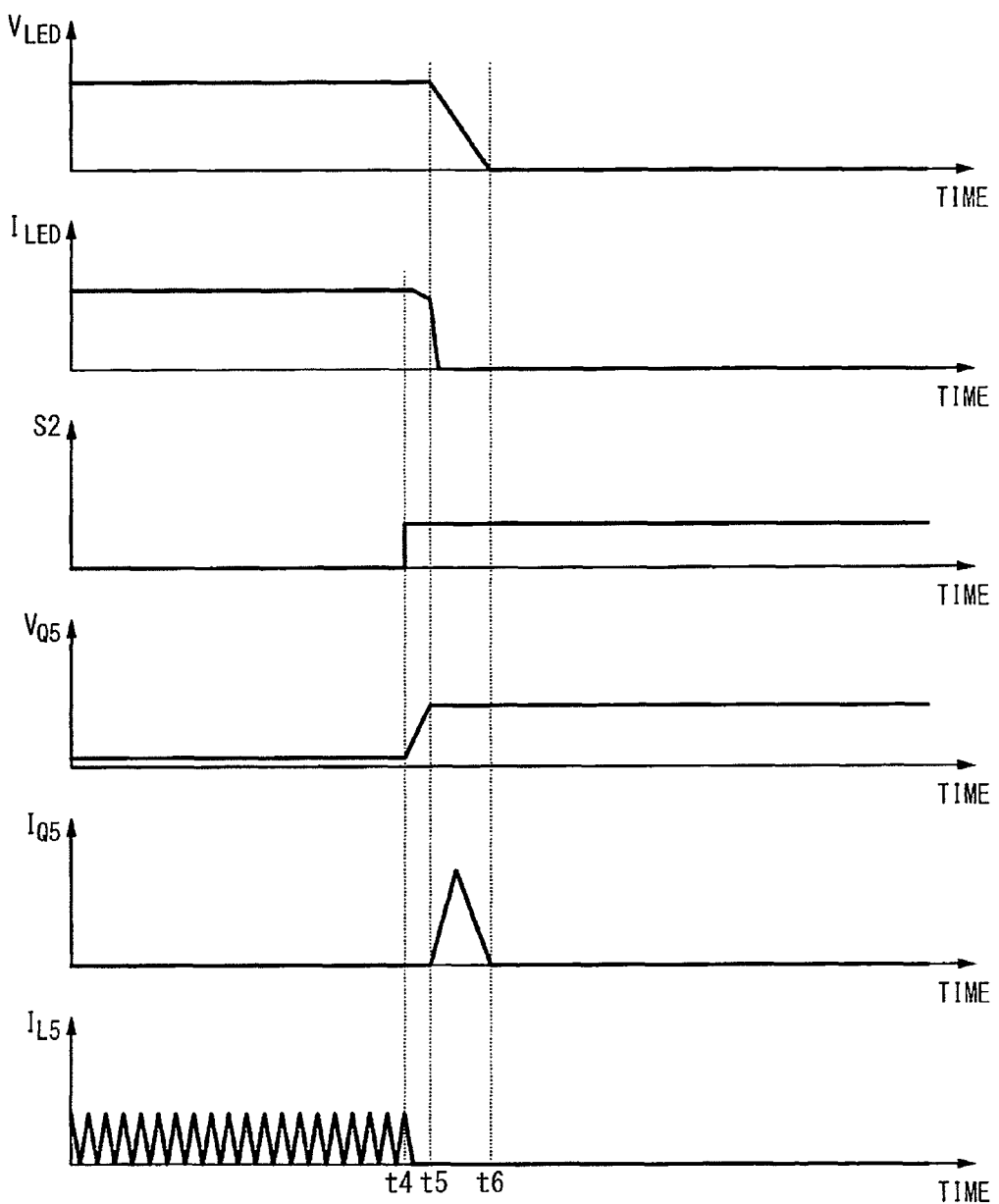
FIG. 3 is an explanatory drawing for operation when the light source portion is turned off, in the lighting device according to the First Embodiment.

Hereinafter, a lighting device according to the present embodiment will be described with reference to FIGS. 1 to 5.

A lighting device 10 according to the present embodiment is configured to turn on a light source portion 20 with LED elements 21, for example.

The light source portion 20 includes the LED elements 21. In the present embodiment, the LED elements 21 are connected in series. However, it is not limited to such a connection relation. For example, the LED elements 21 may be connected in parallel, or connected by combining a series connection and a parallel connection. In the present embodiment, the number of LED elements 21 is two or more, but may be one.

The lighting device 10 includes: a DC power supply 2 that is configured to output a DC voltage with a commercial power source 57 as a power source; and a boosting circuit 3 that is configured to boost, to a first DC voltage, the DC voltage received from the DC power supply 2.

The DC power supply 2 includes: a rectifier 7 that is configured to perform full-wave rectification of an AC voltage received from the commercial power source 57; and a capacitor C1 for smoothing the voltage subjected to the full-wave rectification by the rectifier 7.

The rectifier 7 includes a diode bridge constituted by four diodes D1 to D4, for example.

The capacitor C1 is connected between a pair of output ends of the rectifier 7. A high potential side of the capacitor C1 is connected with a connecting point of a cathode side of the diode D1 and a cathode side of the diode D3. A low potential side of the capacitor C1 is connected with a connecting point of an anode side of the diode D2 and an anode side of the diode D4.

In addition, a filter circuit 1, which is configured to remove noise, is connected with a pair of input ends of the rectifier 7.

The filter circuit 1 includes a capacitor C2, and a common mode filter FL1 with two inductors L1 and L2.

The capacitor C2 is connected between a pair of input ends of the common mode filter FL1. Specifically, the capacitor C2 is connected between a first end of the inductor L1 and a first end of the inductor L2.

A second end of the inductor L1 is connected with a connecting point of an anode side of the diode D1 and a cathode side of the diode D2. A second end of the inductor L2 is connected with a connecting point of an anode side of the diode D3 and a cathode side of the diode D4.

The commercial power source 57 is connected in parallel with the capacitor C2. In other words, the commercial power source 57 is connected between a pair of input ends of the filter circuit 1. Note that, the commercial power source 57 is not included in components of the lighting device 10 according to the present embodiment.

An overcurrent protector FS1 is provided in a feed path between the commercial power source 57 and one of the input ends of the filter circuit 1. The overcurrent protector FS1 is configured to be fused by flowing of an overcurrent. In addition, a switch (not shown), such as a wall switch, is provided in a feed path between the input ends of the filter circuit 1 and the commercial power source 57.

The overcurrent protector FS1 may include a fuse. Hereinafter, in the present embodiment, the overcurrent protector FS1 may be referred to as a "fuse" FS1 for convenience of explanation.

The boosting circuit 3 may include a PFC (Power Factor Correction) circuit, which is capable of improving a power factor of a voltage (input voltage) smoothed through the capacitor C1.

The PFC circuit includes two inductors L3 and L4, a diode D5, three capacitors C3 to C5, seven resistors R1 to R7, two switching elements Q1 and Q2, and a first controlling IC 8 that is configured to control on/off of the switching element Q1.

A first end of the inductor L3 is connected with the high potential side of the capacitor C1. A second end of the inductor L3 is connected with an anode side of the diode D5. A cathode side of the diode D5 is connected with a high potential side of the capacitor C3.

A first end of the inductor L4 is connected with the low potential side of the capacitor C1. In addition, the first end of the inductor L4 is connected with a low potential side of the capacitor C3. A second end of the inductor L4 is connected with a first end of the resistor R1. A second end of the resistor R1 is connected with the first controlling IC 8.

The switching element Q1 is a power MOSFET, for example.

A first main terminal (a drain terminal in the present embodiment) of the switching element Q1 is connected with a connecting point of the second end of the inductor L3 and the anode side of the diode D5. A second main terminal (a source terminal in the present embodiment) of the switching element Q1 is connected with a first end of the resistor R2. A second end of the resistor R2 is connected with the low potential side of the capacitor C1. The source terminal of the switching element Q1 is connected with a first end of the resistor R6. A second end of the resistor R6 is connected with the first controlling IC 8.

A control terminal (a gate terminal in the present embodiment) of the switching element Q1 is connected with a first end of the resistor R3. A second end of the resistor R3 is connected with the first controlling IC 8.

A high potential side of the capacitor C4 is connected with the first controlling IC 8. A low potential side of the capacitor C4 is connected with the first controlling IC 8. In addition, the low potential side of the capacitor C4 is connected with the low potential side of the capacitor C1.

The switching element Q2 is an npn-type transistor, for example.

A first main terminal (a collector terminal in the present embodiment) of the switching element Q2 is connected with a high potential side of the capacitor C5. A second main terminal (an emitter terminal in the present embodiment) of the switching element Q2 is connected with a low potential side of the capacitor C5. The emitter terminal of the switching element Q2 is connected with the low potential side of the capacitor C1.

The high potential side of the capacitor C5 is connected with the first controlling IC 8. The low potential side of the capacitor C5 is connected with a first end of the resistor R7. A second end of the resistor R7 is connected with the first controlling IC 8.

A series circuit of the resistors R4 and R5 is connected in parallel with the capacitor C3. A connecting point of the resistors R4 and R5 is connected with the first controlling IC 8.

The first controlling IC 8 is configured to output a first switching signal for turning on/off the switching element Q1.

The lighting device 10 includes: a step-down circuit 4 that is configured to step down the first DC voltage, boosted by the boosting circuit 3, to a second DC voltage; and a control power supply circuit 5 that is configured to generate a third DC voltage with the DC voltage received from the DC power supply 2. The lighting device 10 further includes a control circuit 6 that is configured to control the boosting circuit 3 and the step-down circuit 4.

The step-down circuit 4 is a step-down converter, for example.

The step-down converter includes a diode D6, two inductors L5 and L6, four capacitors C6 to C9, nine resistors R8 to R16, two switching elements Q3 and Q4, and a second controlling IC 9 that is configured to control on/off of the switching element Q3. The step-down converter further includes a light-emitting diode PD1 of a photocoupler PC1, a Zener diode ZD1, and a smoothing capacitor C10. Note that, $I_{L5}$ in FIG. 1 denotes a current flowing through the inductor L5.

A cathode side of the diode D6 is connected with the high potential side of the capacitor C3. In addition, the cathode side of the diode D6 is connected with a high potential side of the capacitor C6. An anode side of the diode D6 is connected with a first end of the inductor L5. A second end of the inductor L5 is connected with a low potential side of the capacitor C6.

The switching element Q3 is a power MOSFET, for example.

A first main terminal (a drain terminal in the present embodiment) of the switching element Q3 is connected with a connecting point of the anode side of the diode D6 and the first end of the inductor L5. A second main terminal (a source terminal in the present embodiment) of the switching element Q3 is connected with a first end of the resistor R8. A second end of the resistor R8 is connected with the low potential side of the capacitor C3. The source terminal of the switching element Q3 is connected with a first end of the resistor R11. A second end of the resistor R11 is connected with the second controlling IC 9.

A control terminal (a gate terminal in the present embodiment) of the switching element Q3 is connected with a first end of the resistor R10. A second end of the resistor R10 is connected with the second controlling IC 9.

A first end of the inductor L6 is connected with a first end of the resistor R9. A second end of the resistor R9 is connected with the second controlling IC 9. A second end of the inductor L6 is connected with the low potential side of the capacitor C3.

A low potential side of the capacitor C7 is connected with the low potential side of the capacitor C3. In addition, the low potential side of the capacitor C7 is connected with the second controlling IC 9. A high potential side of the capacitor C7 is connected with the second controlling IC 9.

A first end of the resistor R12 is connected with the second controlling IC 9. A second end of the resistor R12 is connected with the low potential side of the capacitor C3.

A high potential side of the capacitor C8 is connected with the second controlling IC 9. A low potential side of the capacitor C8 is connected with the second end of the resistor R12.

A high potential side of the capacitor C9 is connected with the second controlling IC 9. A low potential side of the capacitor C9 is connected with the low potential side of the capacitor C8.

The switching element Q4 is a pnp-type transistor, for example.

A first main terminal (an emitter terminal in the present embodiment) of the switching element Q4 is connected with the second controlling IC 9. The emitter terminal of the switching element Q4 is connected with a first end of the resistor R13. A second end of the resistor R13 is connected with a control terminal (a base terminal in the present embodiment) of the switching element Q4. A second main terminal (a collector terminal in the present embodiment) of the switching element Q4 is connected with an anode side of the light-emitting diode PD1 of the photocoupler PC1. A cathode side of the light-emitting diode PD1 is connected with a first end of the resistor R14. A second end of the resistor R14 is connected with a first end of the resistor R15. A second end of the resistor R15 is connected with a first end of the resistor R16. A second end of the resistor R16 is connected with the low potential side of the capacitor C3. In addition, the second end of the resistor R15 is connected with the second controlling IC 9.

The Zener diode ZD1 is connected in parallel with a series circuit of the resistors R15 and R16. A cathode side of the Zener diode ZD1 is connected with the first end of the resistor R15. An anode side of the Zener diode ZD1 is connected with the second end of the resistor R16.

A high potential side of the capacitor C10 is connected with the high potential side of the capacitor C6. A low potential side of the capacitor C10 is connected with a connecting point of the second end of the inductor L5 and the low potential side of the capacitor C6.

The above-mentioned light source portion 20 is connected in parallel with the capacitor C10.

The second controlling IC 9 is configured to output a second switching signal for turning on/off the switching element Q3.

The control power supply circuit 5 includes an inductor L7, three capacitors C11 to C13, a diode D7, and a power supply IC 11.

A high potential side of the capacitor C11 is connected with a first end of the inductor L7. A second end of the inductor L7 is connected with a cathode side of the diode D7. An anode side of the diode D7 is connected with a low potential side of the capacitor C11. A connecting point of the low potential side of the capacitor C11 and the anode side of the diode D7 is connected with the low potential side of the capacitor C1.

A connecting point of the second end of the inductor L7 and the cathode side of the diode D7 is connected with a high potential side of the capacitor C12. The high potential side of the capacitor C12 is connected with the power supply IC 11. A low potential side of the capacitor C12 is connected with the power supply IC 11.

A high potential side of the capacitor C13 is connected with the power supply IC 11. A low potential side of the capacitor C13 is connected with the power supply IC 11. Here, the high potential side of the capacitor C1 is connected with the power supply IC 11.

The control power supply circuit 5 has a configuration that a voltage across the capacitor C11 becomes the third DC voltage when receiving a DC voltage from the DC power supply 2. In the present embodiment, a value of the third DC voltage is set lower than a value of the DC voltage received from the DC power supply 2.

The control power supply circuit 5 is further configured to supply the third DC voltage to each of the boosting circuit 3, step-down circuit 4 and control circuit 6. The high potential side of the capacitor C11 is connected with the first controlling IC 8. In addition, the high potential side of the capacitor C11 is connected with the second controlling IC 9. Furthermore, the high potential side of the capacitor C11 is connected with the control circuit 6.

The control circuit 6 may be configured by a microcomputer with appropriate programs. The control circuit 6 is connected with a connecting point of the high potential side of the capacitor C8 and the second controlling IC 9. In addition, the control circuit 6 is connected with the low potential side of the capacitor C3. The control circuit 6 is further connected with a control terminal (a base terminal in the present embodiment) of the switching element Q2. The control circuit 6 is further connected with the base terminal of the switching element Q4.

The control circuit 6 is further connected with a dimmer 12 of outputting an indication for turning on/off the light source portion 20 or dimming the light source portion 20. The dimmer 12 is connected with the low potential side of the capacitor C3. The dimmer 12 is configured to output, to the control circuit 6, an indication signal of indicating turning on/off of the light source portion 20 or dimming of the light source portion 20. As the indication signal, a PWM signal may be used. Note that, the dimmer 12 is not included in components of the lighting device 10 according to the present embodiment.

In the lighting device 10 according to the present embodiment, a series circuit of resistors R17 and R18 is connected in parallel with the capacitor C1.

The series circuit of the resistors R17 and R18 constitutes a first detecting portion 13 for detecting of an output voltage of the DC power supply 2. A connecting point of the resistors R17 and R18 is connected with the control circuit 6. In other words, a voltage (across the resistor R18), which obtained by dividing the output voltage of the DC power supply 2 via the resistors R17 and R18, is applied to the control circuit 6 in the lighting device 10. Accordingly, the control circuit 6 can detect the output voltage of the DC power supply 2.

In the lighting device 10 according to the present embodiment, a series circuit of resistors R19 and R20 is connected in parallel with the series circuit of the resistors R4 and R5.

The series circuit of the resistors R19 and R20 constitutes a second detecting portion 14 for detecting of an output voltage of the boosting circuit 3. A connecting point of the resistors R19 and R20 is connected with the control circuit 6. In other words, a voltage (across the resistor R20), which obtained by dividing the output voltage of the boosting circuit 3 via the resistors R19 and R20, is applied to the control circuit 6 in the lighting device 10. Accordingly, the control circuit 6 can detect the output voltage of the boosting circuit 3.

The low potential side of the capacitor C10 is connected with a first end of a resistor R21. A second end of the resistor R21 is connected with a first end of a resistor R22. A second end of the resistor R22 is connected with the low potential side of the capacitor C3.

A series circuit of the resistors R21 and R22 constitutes a third detecting portion 15 for detecting of a voltage on the low potential side of the capacitor C10. A connecting point of the resistors R21 and R22 is connected with the control circuit 6. In other words, a voltage (across the resistor R22), which obtained by dividing the voltage on the low potential side of the capacitor C10 via the resistors R21 and R22, is applied to the control circuit 6 in the lighting device 10. Accordingly, the control circuit 6 can detect the voltage on the low potential side of the capacitor C10.

Here, in the lighting device 10 according to the present embodiment, the step-down circuit 4 is provided with a switching circuit 16. The switching circuit 16 includes a series circuit of a current limiting element 28 and a switching element Q5. The series circuit of the current limiting element 28 and the switching element Q5 is connected in parallel with the capacitor C10. In other words, the switching circuit 16 is connected in parallel with the light source portion 20.

The switching circuit 16 includes the current limiting element 28, the switching element Q5, a capacitor C14, two Zener diodes ZD2 and ZD3, two resistors R23 and R24, and a phototransistor PT1 of the photocoupler PC1.

The current limiting element 28 is a resistor, for example.

The switching element Q5 is a power MOSFET, for example.

A first main terminal (a drain terminal in the present embodiment) of the switching element Q5 is connected with a first end of the current limiting element 28. A second end of the current limiting element 28 is connected with the high potential side of the capacitor C6. A second main terminal (a source terminal in the present embodiment) of the switching element Q5 is connected with the low potential side of the capacitor C6. A control terminal (a gate terminal in the present embodiment) of the switching element Q5 is connected with an anode side of the Zener diode ZD2. A cathode side of the Zener diode ZD2 is connected with a first end of the resistor R23. A second end of the resistor R23 is connected with the high potential side of the capacitor C6. In addition, the anode side of the Zener diode ZD2 is connected with a first end of the resistor R24. A second end of the resistor R24 is connected with the low potential side of the capacitor C6. Note that, $I_{Q5}$ in FIG. 1 denotes a current flowing between the drain and source terminals of the switching element Q5, and $V_{Q5}$ in FIG. 1 denotes a voltage applied between the gate and source terminals of the switching element Q5, and $I_{ZD2}$ in FIG. 1 denotes a current flowing through the Zener diode ZD2.

A cathode side of the Zener diode ZD3 is connected with a connecting point of the anode side of the Zener diode ZD2 and the resistor R24. An anode side of the Zener diode ZD3 is connected with the low potential side of the capacitor C6.

A high potential side of the capacitor C14 is connected with the cathode side of the Zener diode ZD3. A low potential side of the capacitor C14 is connected with the low potential side of the capacitor C6. In addition, the high potential side of the capacitor C14 is connected with a collector terminal of the phototransistor PT1 of the photocoupler PC1. An emitter terminal of the phototransistor PT1 is connected with the low potential side of the capacitor C6.

The switching circuit 16 is configured to control on/off of the switching element Q5 in response to on/off of the phototransistor PT1. The switching circuit 16 is further configured to remove, with the capacitor C14, noise generated by the switching element Q5. Therefore, the switching circuit 16 can prevent the phototransistor PT1 from malfunctioning due to the noise generated by the switching element Q5.

Hereinafter, operation of the lighting device 10 according to the present embodiment will be described, where the switching elements Q2 and Q5 are in OFF-states, and the switching element Q4 is in an ON-state.

In the lighting device 10 according to the present embodiment, the DC power supply 2 outputs a DC voltage, when receiving an AC voltage from the commercial power source 57, through operation to the above-mentioned switch. Note that, an absolute value of the AC voltage from the commercial power source 57 is set within a range of 200 [V] to 266 [V].

The control power supply circuit 5 generates the third DC voltage with the output voltage (DC voltage) of the DC power supply 2. The control power supply circuit 5 supplies the generated third DC voltage to each of the boosting circuit 3, step-down circuit 4 and control circuit 6.

The control circuit 6 changes, from a low level to a high level, an output level of a first control signal S1 for controlling the boosting circuit 3, when receiving the third DC voltage from the control power supply circuit 5. In the lighting device 10, when the output level of the first control signal S1 from the control circuit 6 is changed from the low level to the high level, the switching element Q2 of the boosting circuit 3 is switched from an OFF-state to an ON-state.

In the boosting circuit 3, when the third DC voltage by the control power supply circuit 5 is input to the first controlling IC 8 in the ON-state of the switching element Q2, the first controlling IC 8 falls into a stopped state.

The control circuit 6 changes, from a low level to a high level, an output level of a second control signal S2 for controlling the step-down circuit 4, when receiving the third DC voltage from the control power supply circuit 5. In the lighting device 10, when the output level of the second control signal S2 from the control circuit 6 is changed from the low level to the high level, the switching element Q4 of the step-down circuit 4 is switched from an ON-state to an OFF-state.

In the step-down circuit 4, even when the third DC voltage by the control power supply circuit 5 is input to the second controlling IC 9 in the OFF-state of the switching element Q4, no current flows through the light-emitting diode PD1 of the photocoupler PC1. Therefore, because, in the step-down circuit 4, no voltage across the resistor R16 is applied to the second controlling IC 9, the second controlling IC 9 falls into a stopped state.

The control circuit 6 determines whether or not the output voltage of the DC power supply 2, detected by the first detecting portion 13, is equal to or more than a first defined voltage, when receiving the third DC voltage from the control power supply circuit 5. When it is determined that the output voltage of the DC power supply 2 is equal to or more than the first defined voltage, the control circuit 6 determines whether or not the output voltage of the boosting circuit 3, detected by the second detecting portion 14, is equal to or more than a second defined voltage (280 [V] in the present embodiment). Note that, in the lighting device 10 according to the present embodiment, when the AC voltage is supplied from the commercial power source 57, the output voltage of the boosting circuit 3 falls within a range of 280 [V] to 375 [V].

In addition, when the output voltage of the boosting circuit 3 is equal to or more than the first defined voltage, the control circuit 6 changes, from the high level to the low level, the output level of the first control signal S1 to be transmitted to the boosting circuit 3 to switch the switching element Q2 of the boosting circuit 3 from the ON-state to the OFF-state.

In the lighting device 10, when the switching element Q2 is switched to the OFF-state in a state where the third DC voltage by the control power supply circuit 5 is input to the first controlling IC 8, operation of the first controlling IC 8 is started. The first controlling IC 8 outputs the first switching signal to perform on/off operation of the switching element Q1.

The boosting circuit 3 can boost, to the first DC voltage (410 V in the present embodiment), the DC voltage received from the DC power supply 2, by the first controlling IC 8 performing the on/off operation of the switching element Q1.

When receiving the third DC voltage from the control power supply circuit 5, the control circuit 6 performs subtraction between the output voltage of the boosting circuit 3, detected by the second detecting portion 14, and the voltage on the low potential side of the capacitor C10, detected by the third detecting portion 15. Accordingly, the control circuit 6 calculates a voltage $V_{LED}$ across the capacitor C10 (i.e., the output voltage of the step-down circuit 4).

The control circuit 6 further determines whether or not the voltage $V_{LED}$ across the capacitor C10 is equal to or less than a third defined voltage (100 V in the present embodiment). Note that, in the lighting device 10 according to the present embodiment, the second and third detecting portions 14 and 15 constitute a detector of detecting the voltage $V_{LED}$ across the capacitor C10 (output voltage of the step-down circuit 4). In the lighting device 10, when the AC voltage is supplied from the commercial power source 57, the voltage $V_{LED}$ across the capacitor C10 falls within a range of 68 [V] to 91 [V]. This voltage within the range of 68 [V] to 91 [V] is a voltage at which the LED elements 21 cannot emit light. In FIG. 1, $I_{LED}$ denotes an output current of the step-down circuit 4.

When it is determined that the voltage $V_{LED}$ across the capacitor C10 is equal to or less than the third defined voltage, the control circuit 6 changes, from the high level to the low level, the output level of the second control signal S2 to be transmitted to the step-down circuit 4 (at a time t1 in FIG. 2) to switch the switching element Q4 of the step-down circuit 4 from the OFF-state to the ON-state.

In the lighting device 10 according to the present embodiment, when the switching element Q4 is in the ON-state, a current flows through the light-emitting diode PD1 of the photocoupler PC1. Accordingly, in the step-down circuit 4, a voltage across the resistor R16 is applied to the second controlling IC 9.

When the voltage across the resistor R16 is equal to or more than a predetermined reference voltage, operation of the second controlling IC 9 is started. The second controlling IC 9 outputs the second switching signal to perform on/off operation of the switching element Q3.

The step-down circuit 4 steps down, to the second DC voltage (e.g., a rated voltage of the light source portion 20), the first DC voltage, boosted by the boosting circuit 3, by the second controlling IC 9 performing the on/off operation of the switching element Q3.

In the step-down circuit 4, when the second DC voltage reaches a Zener voltage of the Zener diode ZD2 (at a time t2 in FIG. 2), the current $I_{ZD2}$ flows through the Zener diode ZD2. Here, in the step-down circuit 4, because the current $I_{ZD2}$ flows through the phototransistor PT1 of the photocoupler PC1 in an ON-state of the phototransistor PT1, the switching element Q5 is maintained in the OFF-state. In the present embodiment, the Zener voltage of the Zener diode ZD2 is set less than the rated voltage of the light source portion 20.

In the lighting device 10, when the voltage $V_{LED}$ across the capacitor C10 (the output voltage of the step-down circuit 4) reaches the rated voltage (150 V in the present embodiment) of the light source portion 20 (at a time t3 in FIG. 2), the LED elements 21 of the light source portion 20 emit light. Note that, a forward current of the LED elements 21 is set to 0.7 [A] in the lighting device 10 according to the present embodiment. In the present embodiment, an electric power to be consumed in the light source portion 20 is set to 100 [W].

The control circuit 6 determines whether or not a value of the voltage $V_{LED}$ across the capacitor C10 is within a predetermined range. When it is determined that the value of the voltage $V_{LED}$ across the capacitor C10 is out of the predetermined range, the control circuit 6 changes, from the low level to the high level, the output level of each control signal to be transmitted to the boosting circuit 3 and the step-down circuit 4. When it is determined that the value of the voltage $V_{LED}$ across the capacitor C10 is within the predetermined range, the control circuit 6 changes, from the high level to the low level, the output level of each control signal to be transmitted to the boosting circuit 3 and the step-down circuit 4. Therefore, in the lighting device 10 according to the present embodiment, it is possible to adjust the voltage $V_{LED}$ across the capacitor C10 so as to have a constant magnitude, and accordingly, it is possible to apply a constant voltage to the light source portion 20 even if the input voltage to be supplied to the lighting device 10 fluctuates. As a result, in the lighting device 10, it is possible to stabilize optical outputs of the LED elements 21 (an optical output of the light source portion 20).

When receiving the indication signal of indicating turning off of the light source portion 20 from the dimmer 12, the control circuit 6 changes, from the low level to the high level, the output level of the second control signal S2 to be transmitted to the step-down circuit 4 (at a time t4 in FIG. 3) to switch the switching element Q4 of the step-down circuit 4 from the ON-state to the OFF-state.

In the lighting device 10, when the switching element Q4 is switched to the OFF-state, no current flows through the light-emitting diode PD1 of the photocoupler PC1, and accordingly, the voltage across the resistor R16 is reduced to a voltage less than the reference voltage, and then the second controlling IC 9 falls into the stopped state. Furthermore, in the lighting device 10, when the switching element Q4 is switched to the OFF-state, no current flows through the light-emitting diode PD1 of the photocoupler PC1, and accordingly, the phototransistor PT1 is switched from the ON-state to the OFF-state. Then, in the lighting device 10, when the phototransistor PT1 is switched to the OFF-state, the switching element Q5 is switched from the OFF-state to the ON-state (at a time t5 in FIG. 3).

When the switching element Q5 is switched to the ON-state, the step-down circuit 4 allows the capacitor C10 to discharge electric charge previously stored in it.

In the lighting device 10, when the voltage $V_{LED}$ across the capacitor C10 is reduced to a voltage less than the rated voltage of the light source portion 20, the LED elements 21 of the light source portion 20 are turned off. Note that, t6 in FIG. 3 denotes a time point at which discharging of the capacitor C10 is completed.

Figure 5:
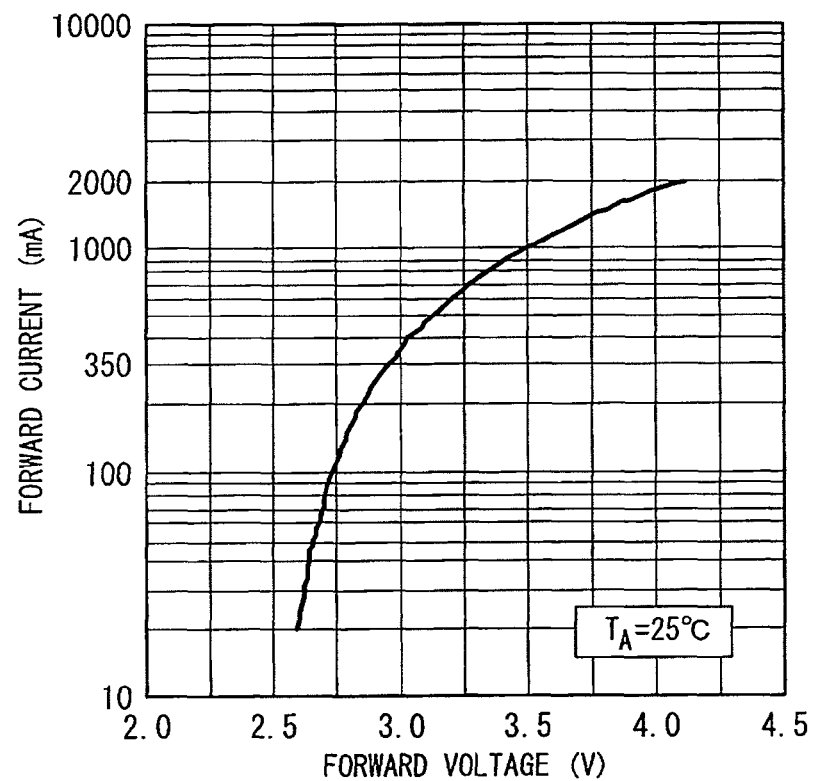
FIG. 5 is an explanatory drawing for current-voltage characteristics of an LED element.

In the lighting device 10 according to the present embodiment, the LED elements 21 each have current-voltage characteristics as shown in FIG. 5, for example. Here, the inventors of the present application considered setting of a voltage across an LED element 21 to be turned off, to a voltage equal to or less than 60% of a forward voltage of the LED element 21. Furthermore, the inventors considered setting of the voltage across the LED element 21 to be turned off, to a voltage equal to or less than 50% of the forward voltage of the LED element 21, taking variations among the LED elements 21 in into consideration.

Further, the lighting device 10 according to the present embodiment is configured so that a relationship of "$V_{in}/V_{out}$>0.5" is satisfied, where $V_{in}$ denotes an effective value of a voltage input to the lighting device 10 (an AC voltage supplied from the commercial power source 57), and $V_{out}$ denotes the output voltage $V_{LED}$ of the step-down circuit 4. Accordingly, in the lighting device 10 according to the present embodiment, the LED elements 21 of the light source portion 20 are turned off, when a value of "$V_{in}/V_{out}$" is equal to or less than 0.5.

In addition, the inventors considered, as a comparative example, a lighting device including a resistor for discharging (hereinafter, referred to as a "discharge resistor"), instead of the switching element Q5.

In the lighting device as the comparative example, it is required to reduce a resistance value of the discharge resistor, in order to suppress a power loss in a lighting state of the light source portion 20. For this reason, in the lighting device as the comparative example, there is a possibility that a time period (hereinafter, referred to as a "discharge period of the capacitor C10") required for discharging of electric charge previously stored in the capacitor C10 is relatively increased.

On the other hand, in the lighting device 10 according to the present embodiment, the control circuit 6 turns on the switching element Q5, when the step-down circuit 4 is in a stopped state. That is, the control circuit 6 is configured to turn on the switching element Q5, when the step-down circuit 4 is in a stopped state. Accordingly, in the lighting device 10 according to the present embodiment, it is possible to more reduce the discharge period of the capacitor C10, compared with the lighting device as the comparative example.

Here, in the lighting device 10 according to the present embodiment, after the voltage $V_{LED}$ across the capacitor C10 is reduced to a voltage less than the rated voltage of the light source portion 20, the control circuit 6 may monitor the discharge state of the capacitor C10. When there is an abnormality in a discharge state of the capacitor C10 (e.g., when the electric charge previously stored in the capacitor C10 is not discharged), the control circuit 6 may change, from the low level to the high level, the output level of the first control signal S1 to be transmitted to the boosting circuit 3 to switch the first controlling IC 8 to the stopped state. Further, when there is the abnormality in the discharge state of the capacitor C10, the control circuit 6 may change, from the low level to the high level, the output level of the second control signal S2 to be transmitted to the step-down circuit 4 to switch the second controlling IC 9 to the stopped state.

In the lighting device 10 according to the present embodiment, when a short-circuit failure occurs at the switching element Q3 of the step-down circuit 4 in the lighting state of the light source portion 20 (at a time t7 in FIG. 4), the output voltage $V_{LED}$ of the step-down circuit 4 increases, and an overcurrent (an overload current) occurs.

When it is determined that the voltage $V_{LED}$ across the capacitor C10 is equal to or more than a fourth defined voltage that is previously set, the control circuit 6 changes, from the low level to the high level, the output level of the first control signal S1 to be transmitted to the boosting circuit 3 to switch the switching element Q2 from the OFF-state to the ON-state.

In the present embodiment, the fourth defined voltage is set to a voltage (e.g., 300 [V]) more than the rated voltage (150 [V] in the present embodiment) of the light source portion 20.

In the boosting circuit 3, when the switching element Q2 is switched to the ON-state, the first controlling IC 8 falls into the stopped state.

In addition, when it is determined that the voltage $V_{LED}$ across the capacitor C10 is equal to or more than the fourth defined voltage that is previously set, the control circuit 6 changes, from the low level to the high level, the output level of the second control signal S2 to be transmitted to the step-down circuit 4 to switch the switching element Q4 from the ON-state to the OFF-state.

In the step-down circuit 4, when the switching element Q4 is switched to the OFF-state, no current flows through the light-emitting diode PD1 of the photocoupler PC1, and accordingly, the voltage across the resistor R16 is reduced to a voltage less than the predetermined reference voltage, and the second controlling IC 9 falls into the stopped state.

Further, in the step-down circuit 4, when the switching element Q4 is switched to the OFF-state, no current flows through the light-emitting diode PD1 of the photocoupler PC1, and accordingly, the phototransistor PT1 is switched from the ON-state to the OFF-state. In the step-down circuit 4, when the phototransistor PT1 is switched to the OFF-state, the switching element Q5 is switched from the OFF-state to the ON-state (at a time t8 in FIG. 4).

In the lighting device 10, when the switching element Q5 is switched to the ON-state, an overcurrent that occurs at the step-down circuit 4 flows to the low potential side of the capacitor C6 via the current limiting element 28 and the switching element Q5. Therefore, in the lighting device 10 according to the present embodiment, it is possible to prevent the overcurrent occurring at the step-down circuit 4 from flowing through the side of the light source portion 20, and prevent the light source portion 20 from falling into an overloaded state. Furthermore, in the lighting device 10, since it is possible to prevent the light source portion 20 from falling into the overloaded state, it is possible to prevent burning of the light source portion 20.

Figure 4:
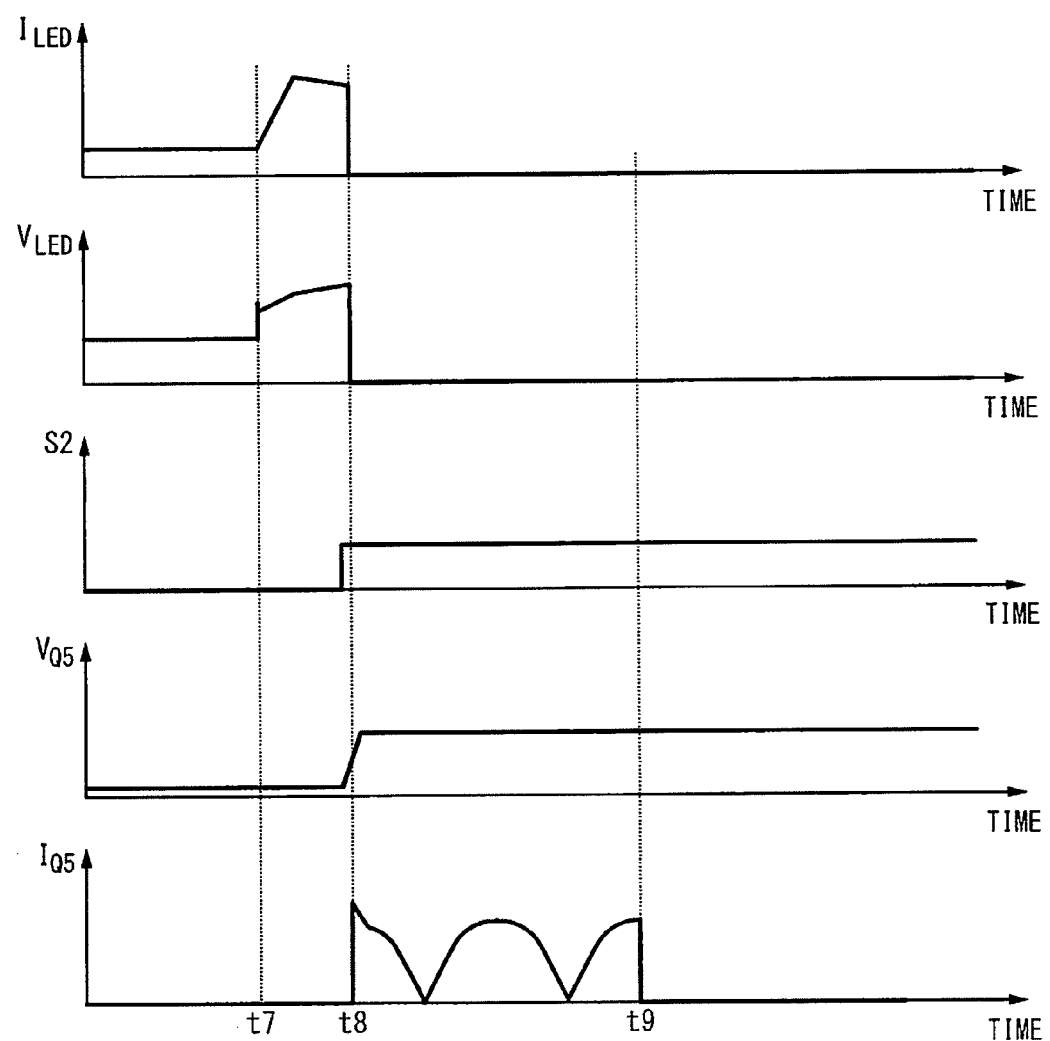
FIG. 4 is an explanatory drawing for operation when a short-circuit failure occurs, in the lighting device according to the First Embodiment.

In the lighting device 10, the overcurrent that has flowed to the low potential side of the capacitor C6 then flows through the inductor L5, the switching element Q3, the resistor R8, the diode D4, the inductor L2, the commercial power source 57, the fuse FS1, the inductor L1, the diode D1, the inductor L3, the diode D5, and the high potential side of the capacitor C6 in that order, and accordingly, the fuse FS1 is fused (at a time t9 in FIG. 4).

Figure 17:
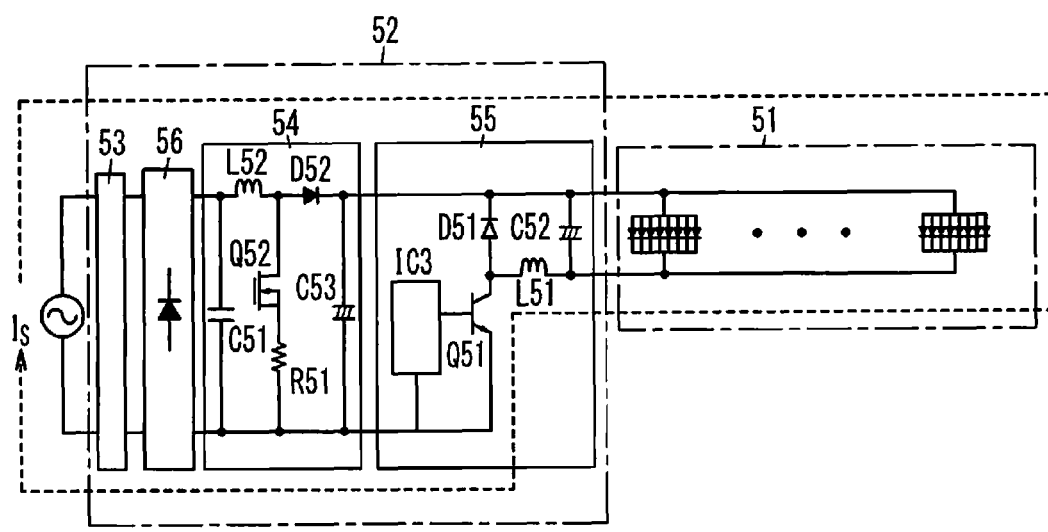
FIG. 17 is a circuit diagram illustrating a lighting circuit portion of a conventional LED luminaire.

Incidentally, regarding a lighting circuit portion 52 of a conventional LED luminaire shown in FIG. 17 (hereinafter, referred to as a "conventional lighting device"), a filter circuit 53 is provided with a fuse. Accordingly, in the conventional lighting device, when a short-circuit failure occurs at a switching element Q51, there is a possibility that a magnitude of an overcurrent $I_s$ becomes more than a magnitude of a rated breaking current of the fuse.

On the other hand, in the lighting device 10 according to the present embodiment, a magnitude of the overcurrent flowing to the low potential side of the capacitor C6 is limited by a resistance value of the current limiting element 28 (a resistor in the present embodiment), when a short-circuit failure occurs at the switching element Q3. Therefore, in the lighting device 10 according to the present embodiment, it is possible to prevent the magnitude of the overcurrent flowing to the low potential side of the capacitor C6 from exceeding a magnitude of the rated breaking current of the fuse FS1. That is, in the lighting device 10, it is possible to prevent a magnitude of an overcurrent flowing to the fuse FS1 from exceeding the magnitude of the rated breaking current of the fuse FS1. Furthermore, in the lighting device 10, it is possible to prevent burning of the fuse FS1, since it is possible to prevent the magnitude of the overcurrent flowing to the fuse FS1 from exceeding the magnitude of the rated breaking current of the fuse FS1.

Here, in the lighting device 10 according to the present embodiment, the current limiting element 28 is a resistor. However, the current limiting element 28 is not limited to this, and may be an NTC (Negative Temperature Coefficient) thermistor. In other words, it is preferred that the current limiting element 28 is the NTC thermistor. Therefore, in the lighting device 10 according to the present embodiment, when the short-circuit failure occurs at the switching element Q3, a temperature of the current limiting element 28 is increased, and accordingly, an impedance of the current limiting element 28 can be reduced. That is, in the lighting device 10, when the current limiting element 28 is the NTC thermistor, it is possible to more increase the magnitude of the overcurrent flowing to the low potential side of the capacitor C6, compared with when the current limiting element 28 is the resistor. Therefore, in the lighting device 10, when the current limiting element 28 is the NTC thermistor, it is possible to more shorten a time until the fuse FS1 is fused after the short-circuit failure occurs at the switching element Q3, compared with when the current limiting element 28 is the resistor. Furthermore, in the lighting device 10, when the current limiting element 28 is the NTC thermistor, the temperature of the current limiting element 28 is decreased upon discharging of the electric charge previously stored in the capacitor C10, and accordingly, the impedance of the current limiting element 28 can be increased. Therefore, in the lighting device 10, it is possible to prevent an excessive stress from being applied to the switching element Q5.

The control circuit 6 may be configured to report the failure of the lighting device 10 to a control device (not shown) capable of remotely controlling the lighting device 10, using a communication medium such as a communication cable, when it is determined that the voltage $V_{LED}$ across the capacitor C10 is equal to or more than the fourth defined voltage that is previously set.

Incidentally, regarding the conventional lighting device, for example when a short-circuit failure occurs at the switching element Q51 of a step-down chopper circuit 55 in the lighting state of the LED light emitting portion 51, a voltage boosted by a boosting chopper circuit 54 is applied to the LED light emitting portion 51. Accordingly, in the conventional lighting device, an overcurrent $I_s$ flows through the LED light emitting portion 51.

An LED element may have current-voltage characteristics as shown in FIG. 5, for example. Therefore, a forward voltage of the LED element tends to increase in response to an increase of a forward current flowing through the LED element. In FIG. 5, for example when the forward current flowing through the LED element increases 4 times, the forward voltage of the LED element increases 1.5 times. In this case, regarding the conventional lighting device, when a short-circuit failure occurs at the switching element Q51 of the step-down chopper circuit 55, electric power, which is 6 times more than electric power upon an normal operation, is supplied to the LED light emitting portion 51, and accordingly, the LED light emitting portion 51 falls into an overloaded state.

Since in the conventional lighting device the filter circuit 53 is provided with a fuse, the fuse can be fused due to the overcurrent $I_s$ flowing through the LED light emitting portion

51, when the short-circuit failure occurs at the switching element Q51 of the step-down chopper circuit 55. However, in the conventional lighting device, there is a possibility that before the fuse is fused, the LED light emitting portion 51 falls into the overloaded state.

On the other hand, in the lighting device 10 according to the present embodiment, when a short-circuit failure occurs at the switching element Q3 of the step-down circuit 4 in the lighting state of the light source portion 20, the switching element Q5 is switched to the ON-state. Accordingly, in the lighting device 10 according to the present embodiment, an overcurrent occurring at the step-down circuit 4 flows to the low potential side of the capacitor C6 via the current limiting element 28 and the switching element Q5. Therefore, in the lighting device 10, it is possible to prevent the overcurrent occurring at the step-down circuit 4 from flowing through the side of the light source portion 20, and prevent the light source portion 20 from falling into an overloaded state.

Note that, in the lighting device 10 according to the present embodiment, the light source portion 20 includes the LED elements 21, however, it is not limited to those. For example, the light source portion 20 may include semiconductor laser elements, or organic EL elements.

The lighting device 10 according to the present embodiment as described above includes: the step-down circuit 4 configured to convert the input voltage (first DC voltage) into the DC voltage (second DC voltage) by no insulation; and the control circuit 6 configured to control the step-down circuit 4. The step-down circuit 4 has the input end, and the step-down circuit 4 is provided on the side of the input end with the overcurrent protector FS1. The overcurrent protector FS1 is configured to be fused by flowing of the overcurrent. The step-down circuit 4 has the output end, the side of which is connected in parallel with the switching circuit 16. The switching circuit 16 includes the switching element Q5. The control circuit 6 is configured to turn on the switching element Q5 according to the output voltage $V_{LED}$ of the step-down circuit 4. Therefore, in the lighting device 10 according to the present embodiment, it is possible to prevent the light source portion 20 from falling into the overloaded state.

In the lighting device 10 according to the present embodiment, the switching circuit 16 further includes the current limiting element 28. The current limiting element 28 is connected in series with the switching element Q5. Therefore, in the lighting device 10 according to the present embodiment, it is possible to prevent the magnitude of the overcurrent flowing to the fuse FS1 from exceeding the magnitude of the rated breaking current of the fuse FS1.

Hereinafter, one example of a luminaire 30 including the lighting device 10 according to the present embodiment will be described with reference to FIG. 6.

The luminaire 30 according to the present embodiment is embedded and disposed in a ceiling member 40, for example.

The luminaire 30 includes the LED elements 21, the lighting device 10 for lighting the LED elements 21, and a housing 31 in which the lighting device 10 is stored. In other words, the luminaire 30 is an LED luminaire that includes the lighting device 10, and the light source portion 20 with the LED elements 21. In the luminaire 30 according to the present embodiment, the light source portion 20 includes the LED elements 21, however, it is limited to the LED elements 21. The light source portion 20 may include organic EL elements. In other words, the luminaire 30 may be an organic EL luminaire that includes the lighting device 10, and the light source portion 20 with the organic EL elements.

The housing 31 has a box shape (a rectangular box shape in the present embodiment). Examples of material for the housing 31 include metals (such as iron, aluminum and stainless steel). In the present embodiment, the housing 31 is disposed on one surface side of the ceiling member 40 (on an upper surface side in FIG. 6). In the present embodiment, a spacer 32 is provided between the housing 31 and the ceiling member 40 to maintain a distance between the housing 31 and the ceiling member 40 to a defined distance.

The housing 31 is provided in one lateral wall thereof (left lateral wall in FIG. 6) with a first lead-out hole (not shown), through which a first connection wire 33 is led out. The first connection wire 33 is electrically connected with the lighting device 10. Also, the first connection wire 33 is electrically connected with a connector 41a for output.

The luminaire 30 further includes a mounting substrate 22, and a luminaire body 23 to which the mounting substrate 22 is attached.

Figure 6:
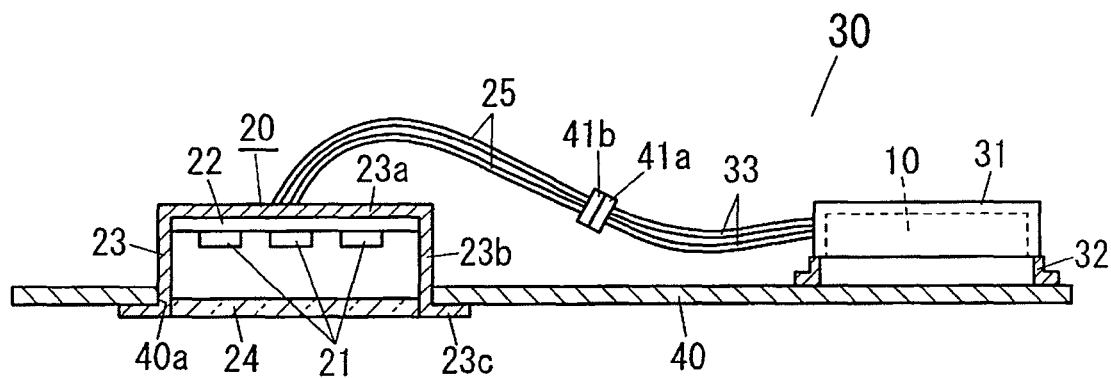
FIG. 6 is a schematic sectional view of a luminaire according to the First Embodiment.

The LED elements 21 are mounted on one surface side of the mounting substrate 22 (on a lower surface side in FIG. 6). The mounting substrate 22 may be a metal base printed wiring substrate, for example. In the present embodiment, the mounting substrate 22 has a circular outer peripheral shape, for example. In the present embodiment, the mounting substrate 22 is provided so as to have a plane size slightly smaller than an opening size of the luminaire body 23. Note that, in FIG. 6, three of the LED elements 21 are shown.

The mounting substrate 22 is electrically connected with a second connection wire 25. The second connection wire 25 is electrically connected with a connector 41b for input. In the present embodiment, the connector 41b for input is detachably connected with the connector 41a for output. In the present embodiment, the lighting device 10 is electrically connected with a conductor on the mounting substrate 22 through connection of the connector 41a for output and the connector 41b for input.

The luminaire body 23 has a bottomed tubular shape (a bottomed cylindrical shape in the present embodiment). Examples of material for the luminaire body 23 include metals (such as iron, aluminum and stainless steel).

The luminaire body 23 is provided in a bottom wall 23a thereof with a second lead-out hole (not shown), through which the second connection wire 25 is led out.

In the luminaire 30 according to the present embodiment, the mounting substrate 22 is disposed inside the bottom wall 23a of the luminaire body 23. In the present embodiment, the mounting substrate 22 is fixed on the bottom wall 23a of the luminaire body 23. In the present embodiment, an adhesive sheet (not shown) having electrical insulation properties and thermal conductivity may be used for fixing the mounting substrate 22 on the bottom wall 23a.

The luminaire body 23 is provided at a lower portion of a lateral wall 23b thereof with a flange 23c configured to extend outside. Further, the luminaire body 23 is provided at the lower portion of the lateral wall 23b thereof with a pair of metal fittings (not shown). The metal fittings are configured to hold, together with the flange 23c, a peripheral edge of the ceiling member 40 near an embedding hole 40a that is previously formed in the ceiling member 40.

In the luminaire 30 according to the present embodiment, the luminaire body 23 can be embedded and disposed in the ceiling member 40 by the metal fittings and the flange 23c holding the peripheral edge of the ceiling member 40 near the embedding hole 40a.

The luminaire 30 further includes a light diffusion plate 24 that is configured to diffuse light emitted from the LED elements 21. The light diffusion plate 24 is provided so as to cover an opening of the luminaire body 23.

Examples of material for the light diffusion plate 24 include light transmissive materials (such as acrylic resin and glass). In the present embodiment, the light diffusion plate 24 has a disk shape, for example. In the present embodiment, the light diffusion plate 24 is detachably attached at the lower portion of the lateral wall 23b of the luminaire body 23.

The luminaire 30 according to the present embodiment described above includes the light source portion 20, and the above-mentioned lighting device 10. In other words, the luminaire (LED luminaire) 30 according to the present embodiment includes the light source portion 20 with the LED elements 21, and the lighting device 10. Alternatively, the luminaire (organic EL luminaire) 30 according to the present embodiment includes the light source portion 20 with the organic EL elements, and the lighting device 10. Therefore, in the present embodiment, it is possible to provide the luminaire 30 including the lighting device 10, which can prevent the light source portion 20 from falling into an overloaded state. Furthermore, in the present embodiment, it is possible to provide the luminaire 30 including the lighting device 10, which can prevent the magnitude of the overcurrent from exceeding the magnitude of the rated breaking current of the overcurrent protector FS1.

Second Embodiment

Figure 7:
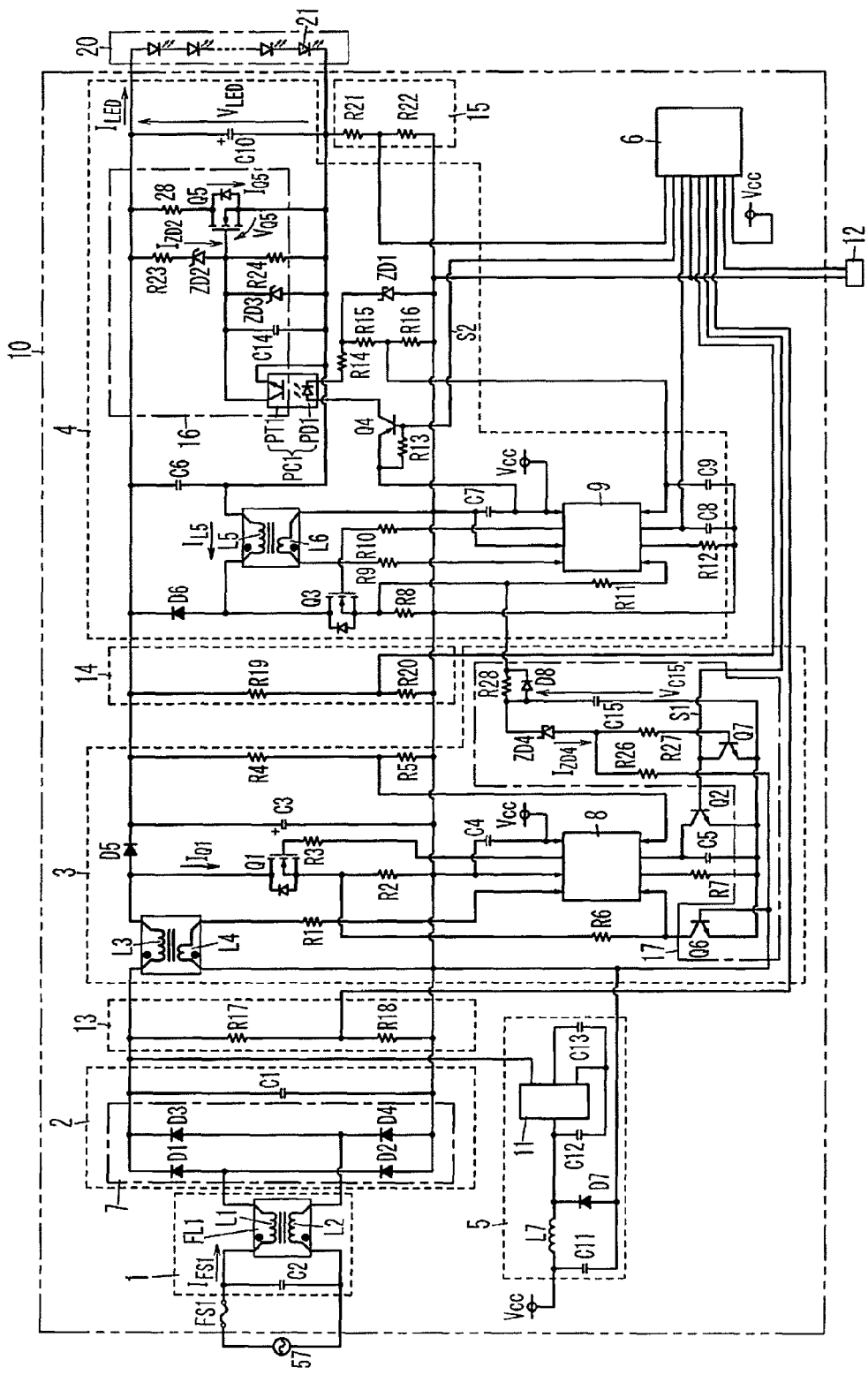
FIG. 7 is a circuit diagram illustrating a lighting device according to Second Embodiment.

A lighting device 10 according to the present embodiment has the same basic constituent elements as the First Embodiment. However, as shown in FIG. 7, the lighting device 10 according to the present embodiment is different from that according to the First Embodiment in that a boosting circuit 3 is provided with an overcurrent detecting portion 17 configured to detect an overcurrent, when a short-circuit failure occurs at a switching element Q3. Note that, regarding the lighting device 10 according to the present embodiment, constituent elements similar to those of the First Embodiment are assigned with same reference numerals, and the explanations thereof are appropriately omitted. In FIG. 7, $I_{FS1}$ denotes a current flowing through a fuse FS1, and $I_{Q1}$ denotes a current flowing between drain and source terminals of a switching element Q1.

The overcurrent detecting portion 17 includes two switching elements Q6 and Q7, three resistors R26 to R28, a diode D8, a capacitor C15, and a Zener diode ZD4. In FIG. 7, $V_{C15}$ denotes a voltage across the capacitor C15, and $I_{ZD4}$ denotes a current flowing through the Zener diode ZD4.

The switching element Q6 is an npn-type transistor, for example.

A first main terminal (a collector terminal in the present embodiment) of the switching element Q6 is connected with a first controlling IC 8. A second main terminal (an emitter terminal in the present embodiment) of the switching element Q6 is connected with a low potential side of a capacitor C1.

The switching element Q7 is an npn-type transistor, for example.

A first main terminal (a collector terminal in the present embodiment) of the switching element Q7 is connected with a base terminal of a switching element Q2. A second main terminal (an emitter terminal in the present embodiment) of the switching element Q7 is connected with the low potential side of the capacitor C1. A control terminal (a base terminal in the present embodiment) of the switching element Q7 is connected with a first end of the resistor R27. A second end of the resistor R27 is connected with an anode side of the Zener diode ZD4. A cathode side of the Zener diode ZD4 is connected with a first end of the resistor R28. A second end of the resistor R28 is connected with a first end of a resistor R11.

A low potential side of the capacitor C15 is connected with the emitter terminal of the switching element Q7. A high potential side of the capacitor C15 is connected with a connecting point of the cathode side of the Zener diode ZD4 and the resistor R28.

An anode side of the diode D8 is connected with the high potential side of the capacitor C15. A cathode side of the diode D8 is connected with the second end of the resistor R28.

In the lighting device 10 according to the present embodiment, an RC filter circuit, which includes the resistor R28 and the capacitor C15, is configured to remove noise generated by the switching element Q3.

Hereinafter, operation of the lighting device 10 according to the present embodiment will be described with reference to FIG. 8. Note that, regarding operation similar to that according to the First Embodiment, the explanation thereof is appropriately omitted.

Figure 8:
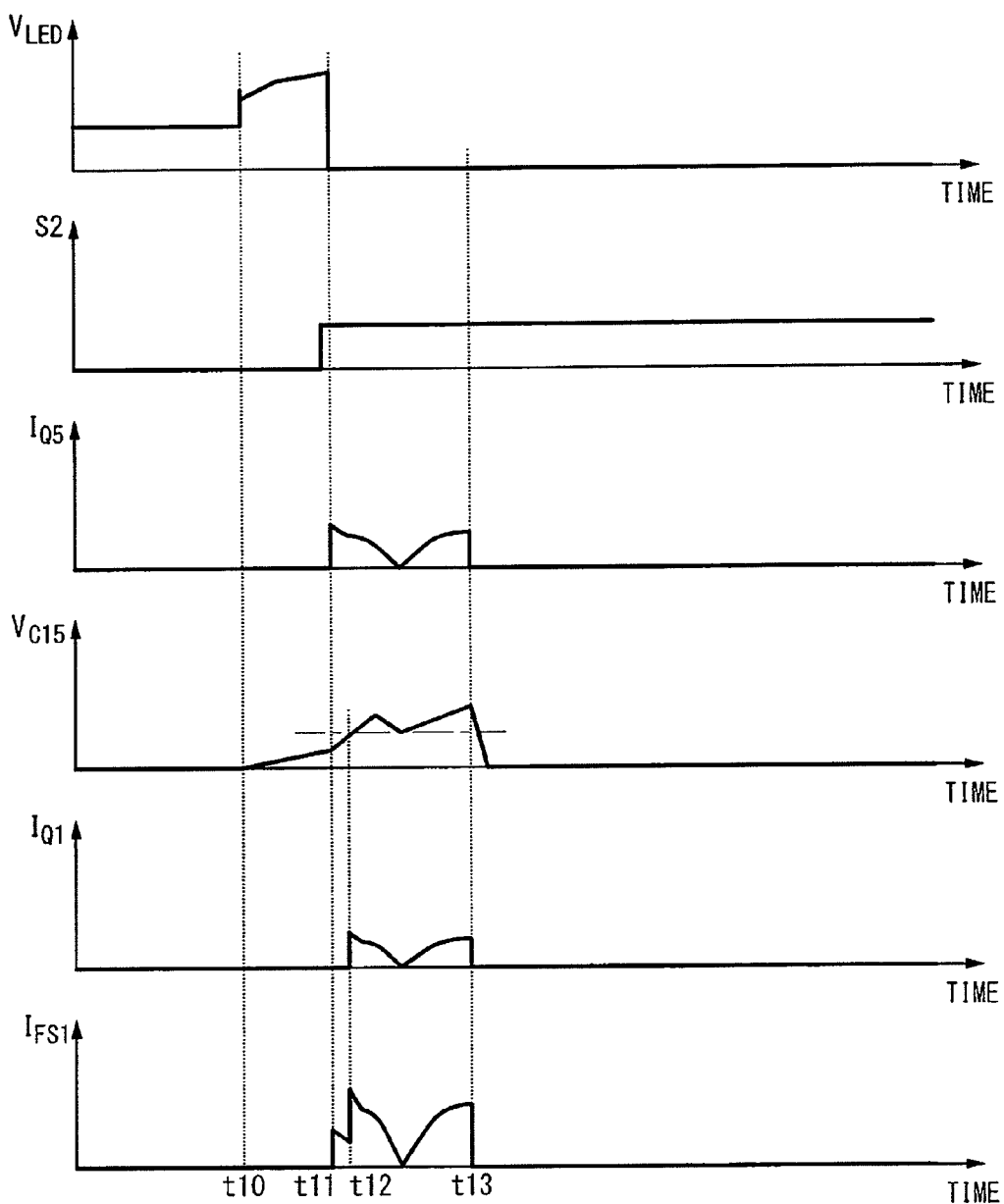
FIG. 8 is an explanatory drawing for operation when a short-circuit failure occurs, in the lighting device according to the Second Embodiment.

In the lighting device 10, when a short-circuit failure occurs at the switching element Q3 (at a time t10 in FIG. 8), the first controlling IC 8 and a second controlling IC 9 fall into stopped states, and a switching element Q5 of a switching circuit 16 is switched to an ON-state (at a time t11 in FIG. 8). Furthermore, in the lighting device 10, an overcurrent flowing through the switching element Q3 flows to the capacitor C15 through the resistor R28, and accordingly, the capacitor C15 is charged. Then, when a voltage across the capacitor C15 reaches a Zener voltage of the Zener diode ZD4 (at a time t12 in FIG. 8) in the lighting device 10, the current $I_{ZD4}$ flows through the Zener diode ZD4.

When the current $I_{ZD4}$ flows through the Zener diode ZD4 in the lighting device 10, both of the switching elements Q6 and Q7 are switched from OFF-states to ON-states. When the switching element Q7 is switched to the ON-state in the lighting device 10, an output level of a first control signal S1 from a control circuit 6 is changed from a high level to a low level, and accordingly, the switching element Q2 is switched from an ON-state to an OFF-state. In the lighting device 10, when the switching element Q2 is switched to the OFF-state in a state where a third DC voltage by a control power supply circuit 5 is input to the first controlling IC 8, operation of the first controlling IC 8 is started.

In the lighting device 10, when the switching element Q6 is switched to the ON-state, the first controlling IC 8 maintains the ON-state of the switching element Q1. Therefore, in the lighting device 10, when the overcurrent detecting portion 17 detects an overcurrent, the boosting circuit 3 boosts, to a first DC voltage, a DC voltage output from a DC power supply 2.

In the lighting device 10, an overcurrent that has flowed to a low potential side of a capacitor C6 flows through an inductor L5, the switching element Q3, a resistor R8, a diode D4, an inductor L2, a commercial power source 57, the fuse FS1, an inductor L1, a diode D1, an inductor L3, a diode D5, and a high potential side of the capacitor C6 in that order, and accordingly, the fuse FS1 is fused (at a time t13 in FIG. 8).

In this way, in the lighting device 10 according to the present embodiment, when the overcurrent detecting portion 17 detects an overcurrent, the boosting circuit 3 boosts, to the first DC voltage, the DC voltage output from the DC power supply 2. Accordingly, in the lighting device 10 according to the present embodiment, it is possible to more increase a magnitude of an overcurrent flowing to the low potential side of the capacitor C6, compared with the lighting device 10 according to the First Embodiment. Therefore, in the lighting device 10 according to the present embodiment, it is possible to more shorten a time until the fuse FS1 is fused after the short-circuit failure occurs at the switching element Q3, compared with the lighting device 10 according to the First Embodiment.

Furthermore, in the lighting device 10 according to the present embodiment, if a disconnection failure has occurred at the resistor R8 due to the overcurrent flowing to the low potential side of the capacitor C6, it is possible to more rapidly charge the capacitor C15, compared with before the disconnection failure. Therefore, in the lighting device 10 according to the present embodiment, it is possible to more shorten a time until the fuse FS1 is fused after the short-circuit failure occurs at the switching element Q3.

Here, in the lighting device 10 according to the present embodiment, when the short-circuit failure occurs at the switching element Q3, the first controlling IC 8 is operated to maintain the ON-state of the switching element Q1 by the overcurrent detecting portion 17. However, the present embodiment is not limited to this. In the lighting device 10 according to the present embodiment, the first controlling IC 8 may be operated to maintain the ON-state of the switching element Q1 through the first control signal output from the control circuit 6.

In the lighting device 10 according to the present embodiment described above, the boosting circuit 3 is provided with the overcurrent detecting portion 17 configured to detect the overcurrent when the short-circuit failure occurs at the switching element Q3. Furthermore, in the lighting device 10 according to the present embodiment, when the overcurrent detecting portion 17 detects the overcurrent, the boosting circuit 3 is configured to boost, to the first DC voltage, the DC voltage output from the DC power supply 2. Therefore, in the lighting device 10 according to the present embodiment, it is possible to more increase the magnitude of the overcurrent flowing to the low potential side of the capacitor C6 and more shorten the time until the fuse FS1 is fused after the short-circuit failure occurs at the switching element Q3, compared with the lighting device 10 according to the First Embodiment.

Note that, the luminaire 30 according to the First Embodiment may include the lighting device 10 according to the present embodiment.

Third Embodiment

Figure 9:
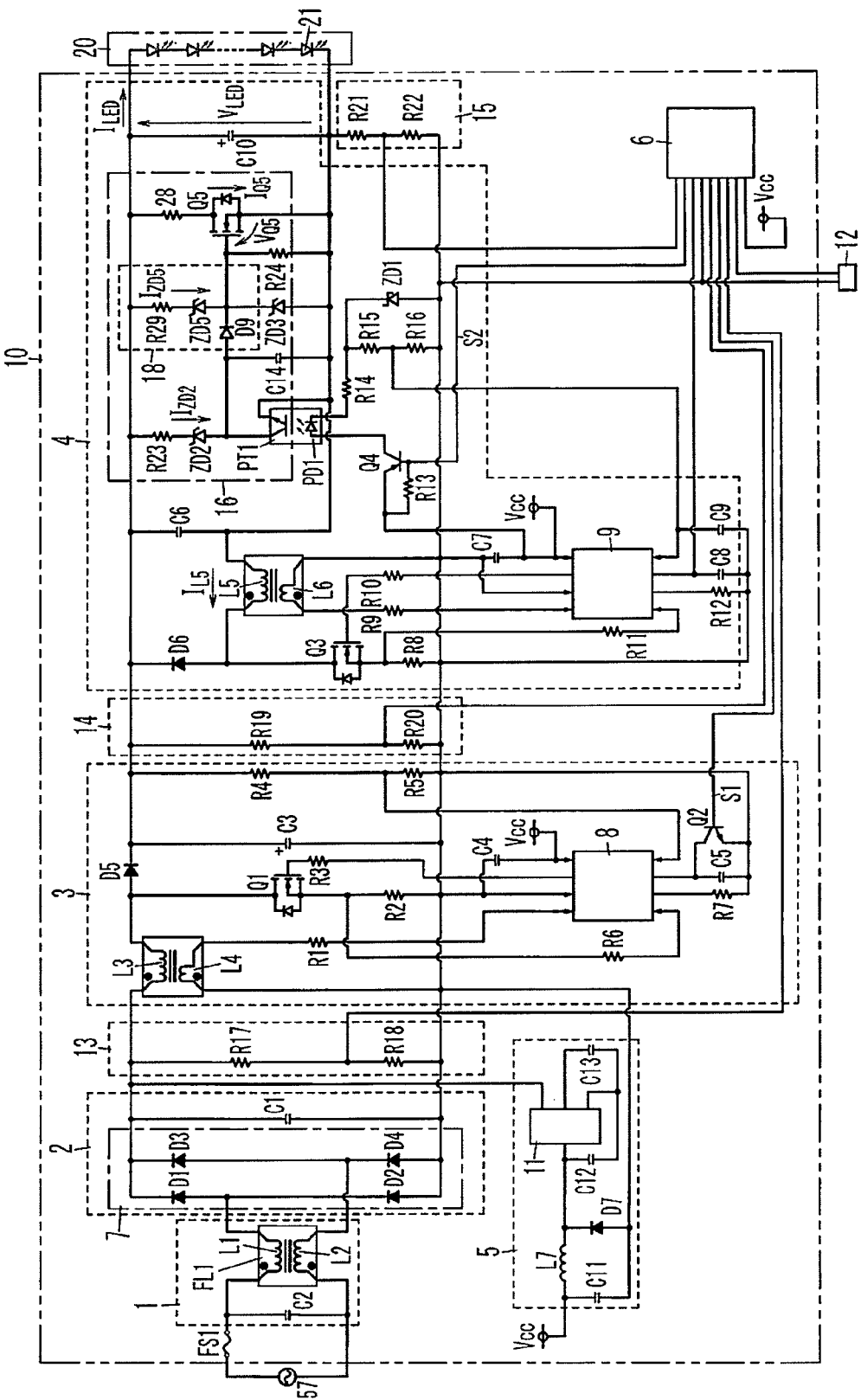
FIG. 9 is a circuit diagram illustrating a lighting device according to Third Embodiment.

A lighting device 10 according to the present embodiment has the same basic constituent elements as the First Embodiment. However, as shown in FIG. 9, the lighting device 10 according to the present embodiment is different from that according to the First Embodiment in that a step-down circuit 4 is provided with a driving portion 18 that is configured to forcibly switch a switching element Q5 from an OFF-state to an ON-state when a voltage $V_{LED}$ across a capacitor C10 reaches a first prescribed voltage that is previously set. Note that, regarding the lighting device 10 according to the present embodiment, constituent elements similar to those of the First Embodiment are assigned with same reference numerals, and the explanations thereof are appropriately omitted.

The driving portion 18 includes a resistor R29, a Zener diode ZD5, and a diode D9. Note that, $I_{ZD5}$ in FIG. 9 denotes a current flowing through the Zener diode ZD5.

A gate terminal of the switching element Q5 is connected with an anode side of the Zener diode ZD5. A cathode side of the Zener diode ZD5 is connected with a first end of the resistor R29. A second end of the resistor R29 is connected with a high potential side of a capacitor C6. In addition, the gate terminal of the switching element Q5 is connected with a first end of a resistor R24. A second end of the resistor R24 is connected with a low potential side of the capacitor C6.

A cathode side of a Zener diode ZD3 is connected with the anode side of the Zener diode ZD5. An anode side of the Zener diode ZD3 is connected with the low potential side of the capacitor C6. In addition, the cathode side of the Zener diode ZD3 is connected with a cathode side of the diode D9. An anode side of the diode D9 is connected with a high potential side of a capacitor C14.

The high potential side of the capacitor C14 is connected with a collector terminal of a phototransistor PT1. An emitter terminal of the phototransistor PT1 is connected with the low potential side of the capacitor C6. In addition, the high potential side of the capacitor C14 is connected with an anode side of a Zener diode ZD2. A cathode side of the Zener diode ZD2 is connected with a first end of a resistor R23. A second end of the resistor R23 is connected with the high potential side of the capacitor C6. A low potential side of the capacitor C14 is connected with the low potential side of the capacitor C6.

In the present embodiment, the first prescribed voltage is set as a voltage (e.g., 300 [V]) that is higher than a rated voltage (150 [V] in the present embodiment) of a light source portion 20. In the present embodiment, a Zener voltage of the Zener diode ZD5 is set as a voltage that is equal to the above-mentioned first prescribed voltage.

In the lighting device 10 according to the present embodiment, when the voltage $V_{LED}$ across the capacitor C10 reaches a Zener voltage of the Zener diode ZD2, a current $I_{ZD2}$ flows through the Zener diode ZD2. In the lighting device 10, when the phototransistor PT1 is in an ON-state, the current $I_{ZD2}$ through the Zener diode ZD2 flows to the phototransistor PT1. In the lighting device 10, when the phototransistor PT1 is in an OFF-state, the current $I_{ZD2}$ through the Zener diode ZD2 flows to the diode D9, and accordingly, the switching element Q5 is switched from the OFF-state to the ON-state.

Here, in the lighting device 10 according to the present embodiment, when the voltage $V_{LED}$ across the capacitor C10 reaches the Zener voltage of the Zener diode ZD5, the current $I_{ZD5}$ flows through the Zener diode ZD5. Further, in the lighting device 10, the driving portion 18 includes the diode D9. Accordingly, in the lighting device 10, even when the phototransistor PT1 is in the ON-state, the current $I_{ZD5}$ through the Zener diode ZD5 flows to the gate terminal of the switching element Q5 without flowing to the phototransistor PT1. Then, in the lighting device 10, when the current $I_{ZD5}$ flows to the gate terminal of the switching element Q5, the switching element Q5 is switched from the OFF-state to the ON-state.

Therefore, in the lighting device 10 according to the present embodiment, when the voltage $V_{LED}$ across the capacitor C10 reaches the first prescribed voltage that is previously set (the Zener voltage of the Zener diode ZD5), it is possible to forcibly switch the switching element Q5 from the OFF-state to the ON-state.

Figure 10:
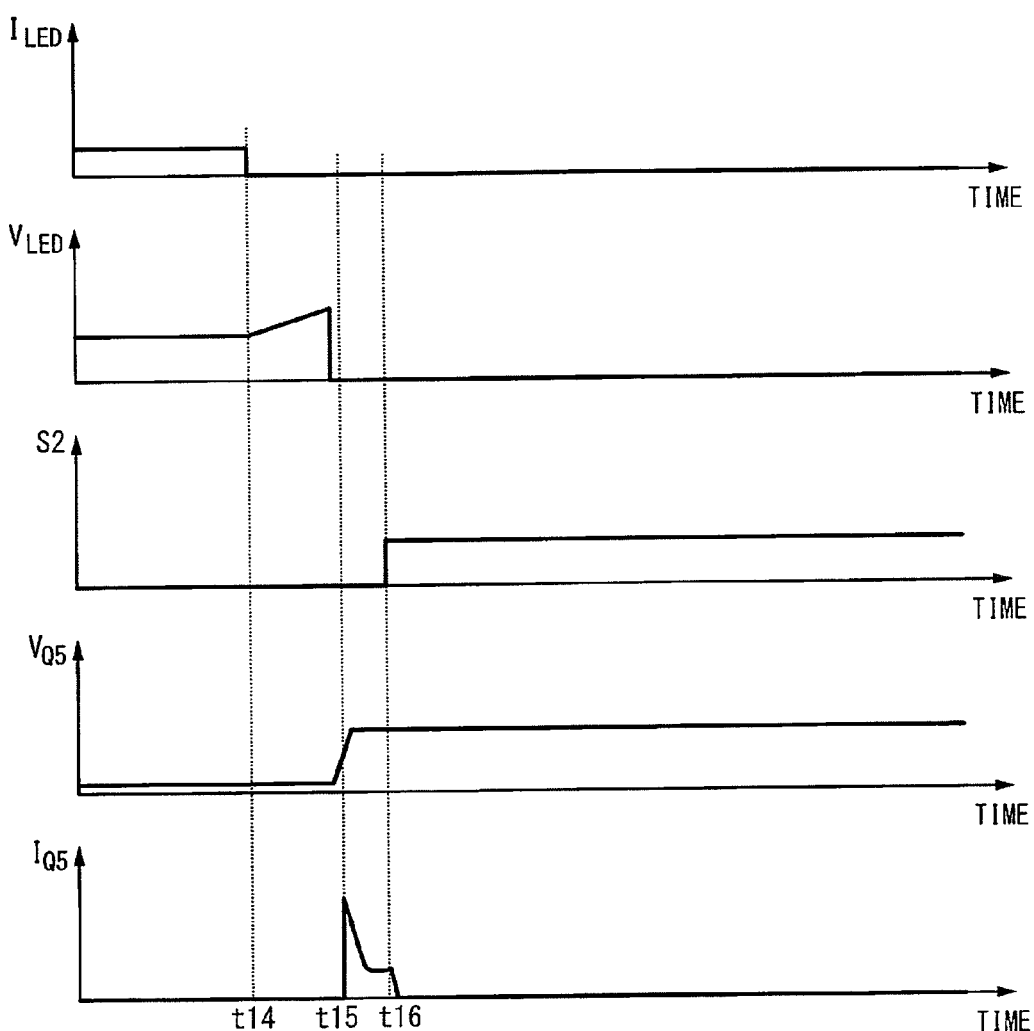
FIG. 10 is an explanatory drawing for operation in the lighting device according to the Third Embodiment.

Hereinafter, as one example, operation of the lighting device 10 according to the present embodiment will be described with reference to FIG. 10. Note that, regarding operation similar to that according to the First Embodiment, the explanation thereof is appropriately omitted.

In the lighting device 10 according to the present embodiment, when for example an electrical connection of the light source portion 20 and the lighting device 10 is released in a lighting state of the light source portion 20 (at a time t14 in FIG. 10), an output voltage $V_{LED}$ of the step-down circuit 4 increases. Further, in the lighting device 10, when the voltage $V_{LED}$ across the capacitor C10 reaches the Zener voltage of the Zener diode ZD5, the current $I_{ZD5}$ flows through the Zener diode ZD5. Then, in the lighting device 10, when the current $I_{ZD5}$ through the Zener diode ZD5 flows to the gate terminal of the switching element Q5, the switching element Q5 is switched from the OFF-state to the ON-state (at a time t15 in FIG. 10).

In the lighting device 10, when the switching element Q5 is switched to the ON-state, the voltage $V_{LED}$ across the capacitor C10 is reduced. When it is determined that a value of the voltage $V_{LED}$ across the capacitor C10 is out of the above-mentioned predetermined range, a control circuit 6 changes, from a low level to a high level, an output level of a second control signal S2 to be transmitted to the step-down circuit 4 (at a time t16 in FIG. 10), and accordingly, a switching element Q4 is switched from an OFF-state to an ON-state.

In the lighting device 10 according to the present embodiment described above, the step-down circuit 4 is provided with the driving portion 18. The driving portion 18 is configured to turn on the switching element Q5, when the output voltage of the step-down circuit 4 (the voltage across the capacitor C10) reaches the first prescribed voltage (the Zener voltage of the Zener diode ZD5) that is previously set. Therefore, in the lighting device 10 according to the present embodiment, it is possible to prevent an overvoltage from being applied on a side of the light source portion 20. Furthermore, in the lighting device 10 according to the present embodiment, since it is possible to prevent the overvoltage from being applied on the side of the light source portion 20, it is possible to more reduce a breakdown voltage of the switching element Q5 or the capacitor C10 for smoothing, compared with the First Embodiment.

Note that, the luminaire 30 according to the First Embodiment may include the lighting device 10 according to the present embodiment.

Fourth Embodiment

Figure 11:
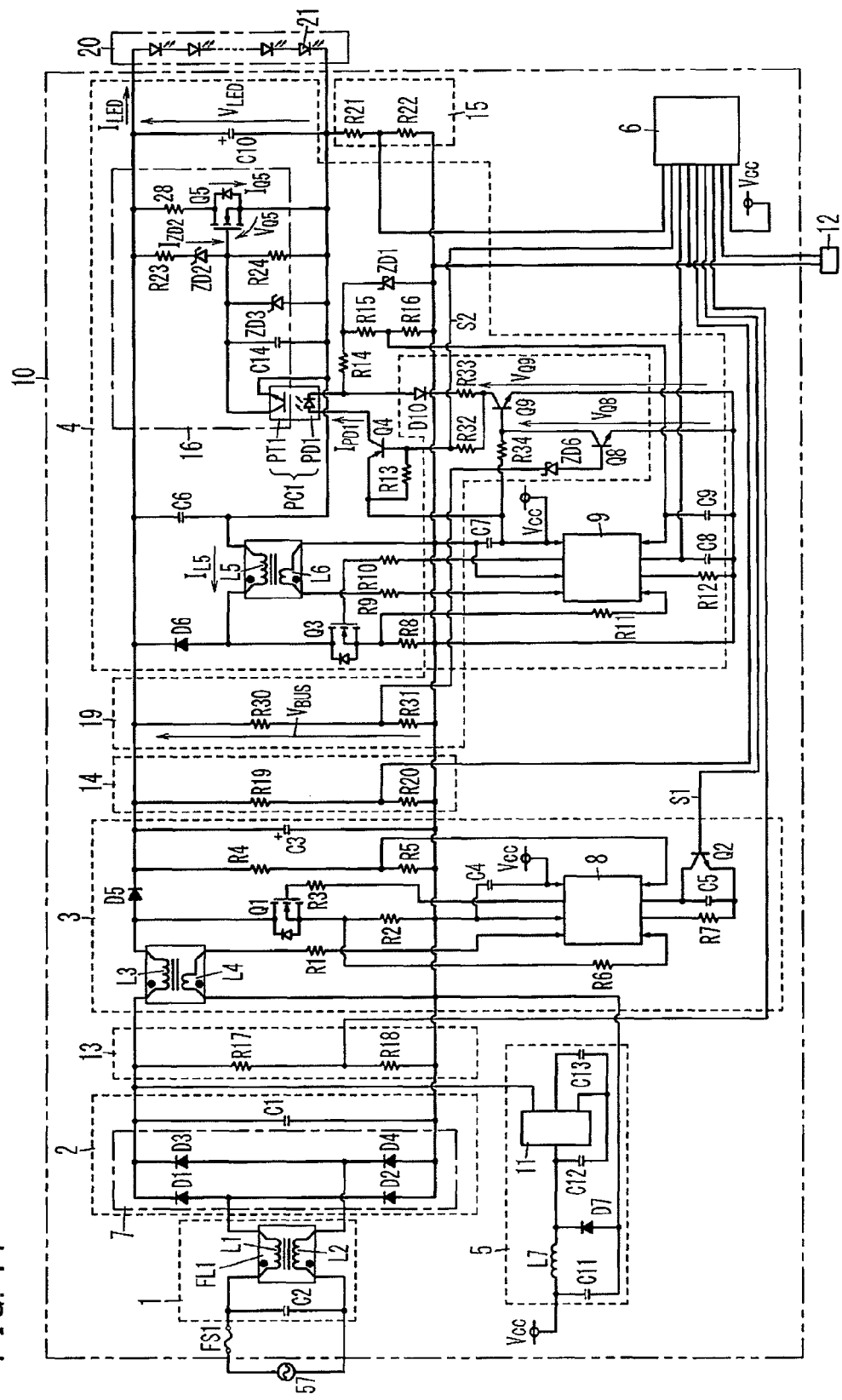
FIG. 11 is a circuit diagram illustrating a lighting device according to Fourth Embodiment.

A lighting device 10 according to the present embodiment has the same basic constituent elements as the First Embodiment. However, as shown in FIG. 11, the lighting device 10 according to the present embodiment is different from that according to the First Embodiment in that a step-down circuit 4 is provided with a controlling portion 19 that is configured not to allow operation of a switching circuit 16 when an output voltage of a boosting circuit 3 is equal to or less than a second prescribed voltage that is previously set. Note that, regarding the lighting device 10 according to the present embodiment, constituent elements similar to those of the First Embodiment are assigned with same reference numerals, and the explanations thereof are appropriately omitted.

The controlling portion 19 includes five resistors R30 to R34, a diode D10, a Zener diode ZD6, and two switching elements Q8 and Q9.

A capacitor C3 of the boosting circuit 3 is connected in parallel with a series circuit of the resistors R30 and R31. Note that, $V_{BUS}$ in FIG. 11 denotes a voltage between both ends of the series circuit of the resistors R30 and R31, and $I_{PD1}$ in FIG. 11 denotes a current flowing through a light-emitting diode PD1 of a photocoupler PC1.

The switching element Q8 is an npn-type transistor, for example.

A first main terminal (a collector terminal in the present embodiment) of the switching element Q8 is connected with a first end of the resistor R34. A second end of the resistor R34 is connected with a second controlling IC 9. A second main terminal (an emitter terminal in the present embodiment) of the switching element Q8 is connected with a low potential side of a capacitor C9. A control terminal (a base terminal in the present embodiment) of the switching element Q8 is connected with an anode side of the Zener diode ZD6. A cathode side of the Zener diode ZD6 is connected with a connecting point of the resistors R30 and R31. Note that, $V_{Q8}$ in FIG. 11 denotes a voltage applied between the collector and emitter terminals of the switching element Q8.

The switching element Q9 is an npn-type transistor, for example.

A first main terminal (a collector terminal in the present embodiment) of the switching element Q9 is connected with a first end of the resistor R32. A second end of the resistor R32 is connected with a connecting point of a resistor R13 and a base terminal of a switching element Q4. In addition, the collector terminal of the switching element Q9 is connected with a first end of the resistor R33. A second end of the resistor R33 is connected with a cathode side of the diode D10. An anode side of the diode D10 is connected with a connecting point of a resistor R14 and a cathode side of the light-emitting diode PD1.

A second main terminal (an emitter terminal in the present embodiment) of the switching element Q9 is connected with the low potential side of the capacitor C9. A control terminal (a base terminal in the present embodiment) of the switching element Q9 is connected with a connecting point of the resistor R34 and the collector terminal of the switching element Q8. Note that, $V_{Q9}$ in FIG. 11 denotes a voltage applied between the collector and emitter terminals of the switching element Q9.

In the lighting device 10 according to the present embodiment, the output voltage of the boosting circuit 3 is divided by the resistors R30 and R31. Accordingly, in the lighting device 10 according to the present embodiment, a voltage across the resistor R31 is applied to the Zener diode ZD6. Further, in the lighting device 10, when the voltage across the resistor R31 reaches a Zener voltage of the Zener diode ZD6, the switching element Q8 is switched from an OFF-state to an ON-state. The Zener voltage of the Zener diode ZD6 is set as a voltage for determining whether or not the output voltage of the boosting circuit 3 agrees with a voltage at which a fuse FS1 can be fused.

In addition, in the lighting device 10 according to the present embodiment, a resistance value of the resistor R33 is set so that a voltage across a resistor R16 is reduced to a voltage less than a predetermined reference voltage, when a third DC voltage by a control power supply circuit 5 is input to the second controlling IC 9.

Hereinafter, operation of the lighting device 10 according to the present embodiment will be described with reference to FIG. 12. Note that, regarding operation similar to that according to the First Embodiment, the explanation thereof is appropriately omitted.

In the lighting device 10 according to the present embodiment, when an AC voltage is supplied from a commercial power source 57 through operation to the above-mentioned switch (at a time t17 in FIG. 12), the output voltage of the boosting circuit 3 increases.

The control power supply circuit 5 generates the third DC voltage when receiving a DC voltage from a DC power supply 2. The control power supply circuit 5 supplies the generated third DC voltage to each of the boosting circuit 3, step-down circuit 4 and control circuit 6.

In the lighting device 10, when the third DC voltage by the control power supply circuit 5 is input to the second controlling IC 9, the switching element Q9 is switched from an OFF-state to an ON-state, and the switching element Q4 is switched from an OFF-state to an ON-state. In the lighting device 10, when the switching element Q4 is switched to the ON-state, a current flows through the light-emitting diode PD1 of the photocoupler PC1 (at a time t18 in FIG. 12), and the phototransistor PT1 is switched to an ON-state. In the lighting device 10, when the phototransistor PT1 is switched to the ON-state, the above-mentioned current $I_{ZD2}$ flows through the phototransistor PT1, and a switching element Q5 is maintained in an OFF-state.

In the lighting device 10, when a short-circuit failure occurs at a switching element Q3 of the step-down circuit 4 in a lighting state of a light source portion 20, an output voltage $V_{LED}$ of the step-down circuit 4 increases, and an overcurrent (an overload current) occurs. Also, in the lighting device 10, when the short-circuit failure occurs at the switching element Q3 of the step-down circuit 4 in the lighting state of the light source portion 20, the output voltage of the boosting circuit 3 increases.

Figure 12:
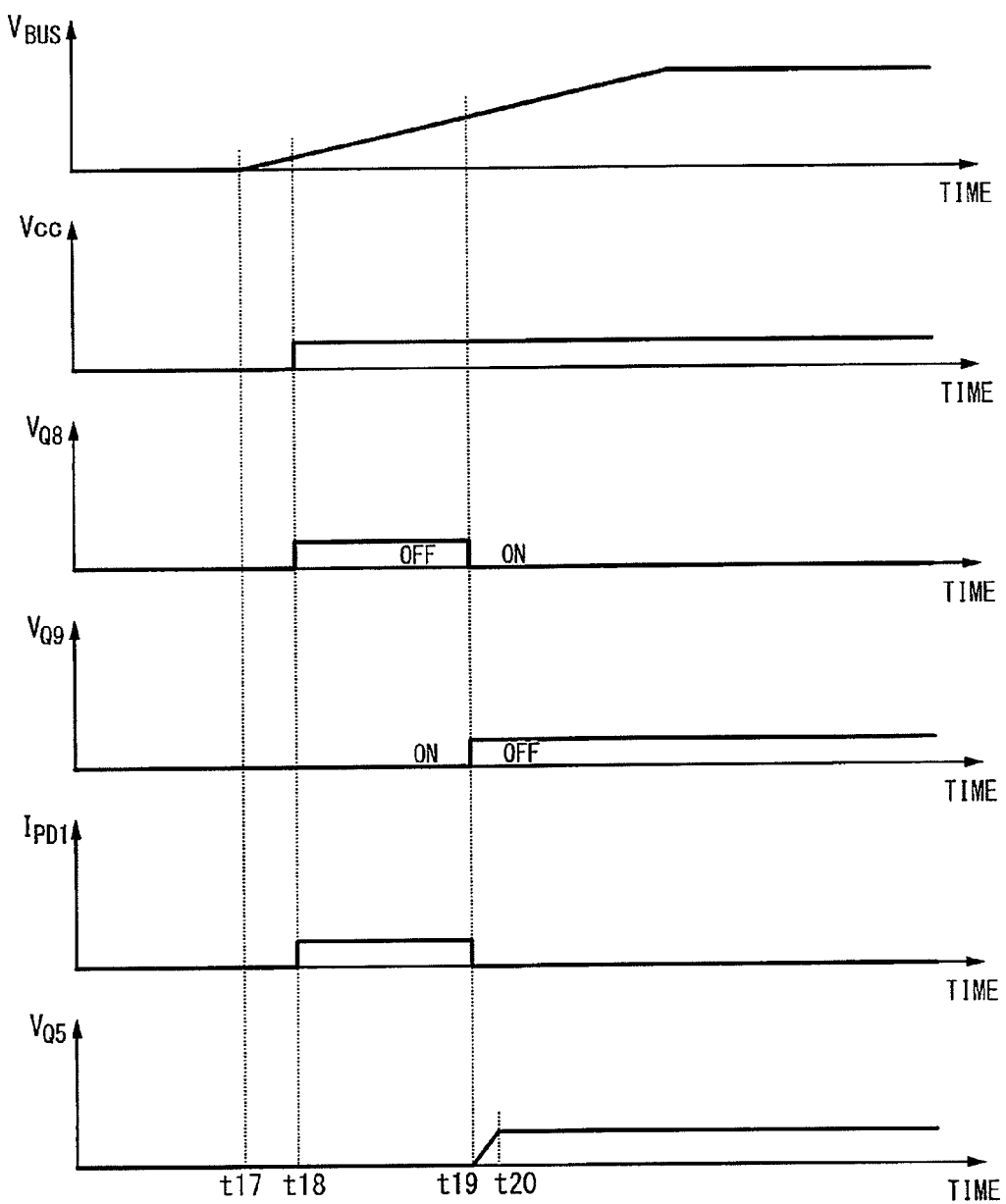
FIG. 12 is an explanatory drawing for operation when a short-circuit failure occurs, in the lighting device according to the Fourth Embodiment.

When the voltage across the resistor R31 reaches the Zener voltage of the Zener diode ZD6, the controlling portion 19 switches the switching element Q8 from the OFF-state to the ON-state (at a time t19 in FIG. 12).

In the lighting device 10, when the switching element Q8 is switched to the ON-state, the switching element Q9 is switched from the ON-state to the OFF-state, and the switching element Q4 is switched from the ON-state to the OFF-state. In the lighting device 10, when the switching element Q4 is switched to the OFF-state, no current flows through the light-emitting diode PD1 of the photocoupler PC1, and the phototransistor PT1 is switched from the ON-state to the OFF-state. In the lighting device 10, when the phototransistor PT1 is switched to the OFF-state, the switching element Q5 is switched from the OFF-state to the ON-state (at a time t20 in FIG. 12). In the step-down circuit 4, when the switching element Q5 is switched to the ON-state, an overcurrent that occurs at the step-down circuit 4 flows to a low potential side of a capacitor C6 via a current limiting element 28 and the switching element Q5. In the lighting device 10, the overcurrent that has flowed to the low potential side of the capacitor C6 then flows through a inductor L5, the switching element Q3, a resistor R8, a diode D4, an inductor L2, the commercial power source 57, the fuse FS1, an inductor L1, a diode D1, an inductor L3, a diode D5, and a high potential side of the capacitor C6 in that order, and accordingly, the fuse FS1 is fused.

The controlling portion 19 is configured not to allow operation of the switching circuit 16, when the output voltage of the boosting circuit 3 (the voltage across the resistor R31) is equal to or less than the second prescribed voltage (a voltage less than the Zener voltage of the Zener diode ZD6). Therefore, in the lighting device 10 according to the present embodiment, it is possible to prevent the switching circuit 16 from operating when the output voltage of the boosting circuit 3 is equal to or less than the second prescribed voltage, and it is possible to more certainly cause fusing of the fuse FS1 due to the overcurrent at the step-down circuit 4.

In the lighting device 10 according to the present embodiment described above, the step-down circuit 4 is provided with the controlling portion 19. The controlling portion 19 is configured not to allow operation of the switching circuit 16, when the input voltage of the step-down circuit 4 (the output voltage of the boosting circuit 3) is equal to or less than the second prescribed voltage that is previously set. Therefore, in the lighting device 10 according to the present embodiment described above, it is possible to prevent the switching circuit 16 from operating when the output voltage of the boosting circuit 3 is equal to or less than the second prescribed voltage, and fuse the fuse FS1 through the overcurrent at the step-down circuit 4. In the lighting device 10, it is possible to prevent the switching circuit 16 from operating when the input voltage of the step-down circuit 4 is equal to or less than the second prescribed voltage, and accordingly, it is possible to more certainly cause fusing of the fuse FS1 due to the overcurrent at the step-down circuit 4.

Note that, the luminaire 30 according to the First Embodiment may include the lighting device 10 according to the present embodiment. In addition, the lighting device 10 according to the present embodiment may include the driving portion 18 in the lighting device 10 according to the Third Embodiment.

Fifth Embodiment

Figure 13:
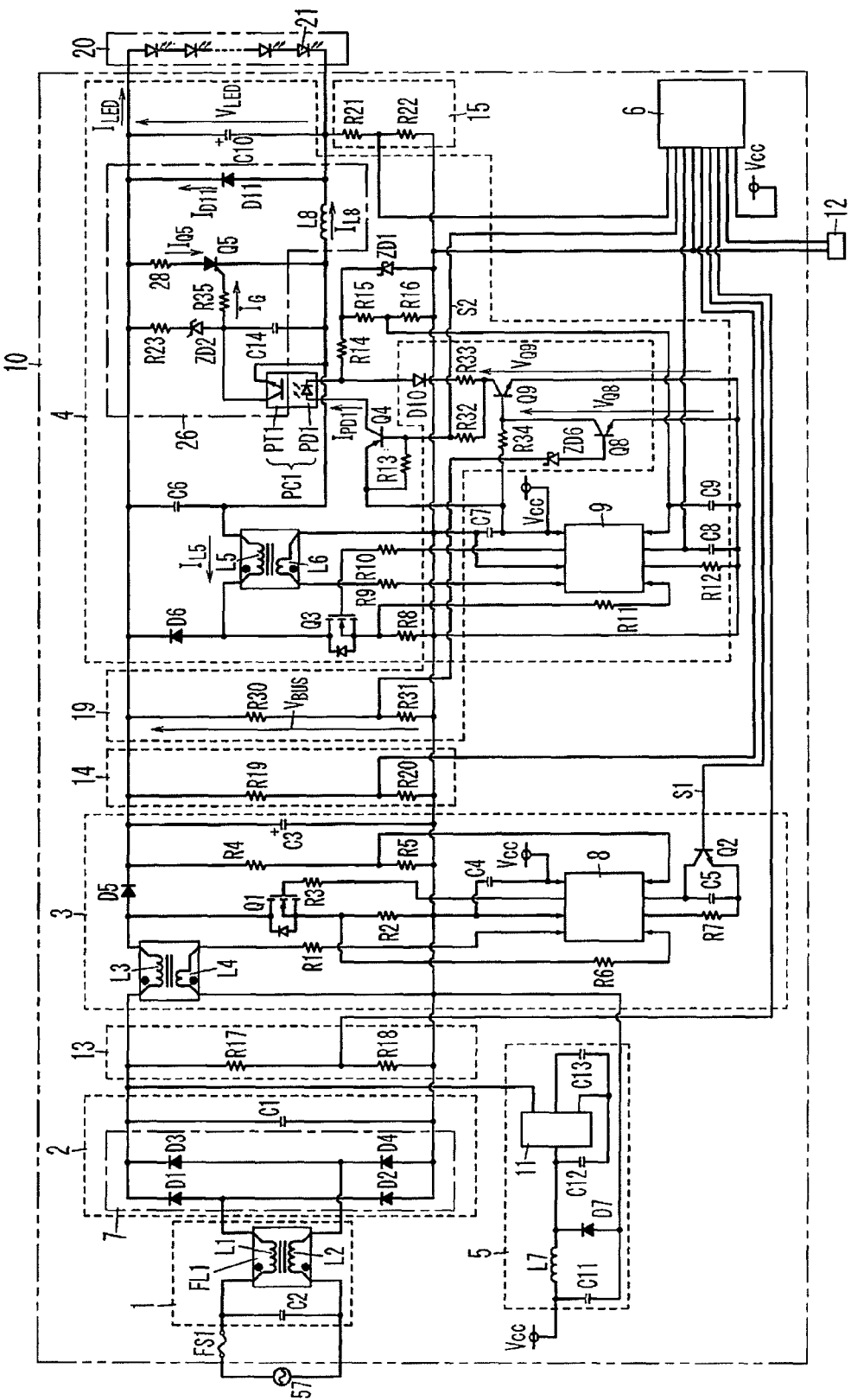
FIG. 13 is a circuit diagram illustrating a lighting device according to Fifth Embodiment.

A lighting device 10 according to the present embodiment has the same basic constituent elements as the Fourth Embodiment. However, as shown in FIG. 13, the lighting device 10 according to the present embodiment is different from that according to the Fourth Embodiment in that a step-down circuit 4 is provided with a switching circuit 26 having a configuration different from that of the switching circuit 16 in the Fourth Embodiment. Note that, regarding the lighting device 10 according to the present embodiment, constituent elements similar to those of the Fourth Embodiment are assigned with same reference numerals, and the explanations thereof are appropriately omitted.

The switching circuit 26 includes a current limiting element 28, two resistors R23 and R35, a phototransistor PT1 of a photocoupler PC1, a Zener diode ZD2, a capacitor C14, a switching element Q5, an inductor L8, and a diode D11. Note that, $I_{L8}$ in FIG. 13 denotes a current flowing through the inductor L8, and $I_{D11}$ in FIG. 13 denotes a current flowing through the diode D11.

The switching element Q5 is a thyristor, for example.

A first main terminal (an anode terminal in the present embodiment) of the switching element Q5 is connected with a first end of the current limiting element 28. A second end of the current limiting element 28 is connected with a high potential side of a capacitor C6. A second main terminal (a cathode terminal in the present embodiment) of the switching element Q5 is connected with a low potential side of the capacitor C6. A control terminal (a gate terminal in the present embodiment) of the switching element Q5 is connected with a first end of the resistor R35. A second end of the resistor R35 is connected with a collector terminal of the phototransistor PT1. An emitter terminal of the phototransistor PT1 is connected with the low potential side of the capacitor C6.

A high potential side of the capacitor C14 is connected with a connecting point of the resistor R35 and the collector terminal of the phototransistor PT1. A low potential side of the capacitor C14 is connected with the low potential side of the capacitor C6. In addition, the high potential side of the capacitor C14 is connected with an anode side of the Zener diode ZD2. A cathode side of the Zener diode ZD2 is connected with a first end of the resistor R23. A second end of the resistor R23 is connected with the high potential side of the capacitor C6.

The cathode terminal of the switching element Q5 is connected with a first end of the inductor L8. A second end of the inductor L8 is connected with an anode side of the diode D11. A cathode side of the diode D11 is connected with the second end of the current limiting element 28. In addition, the cathode side of the diode D11 is connected with a high potential side of a capacitor C10. A low potential side of the capacitor C10 is connected with the anode side of the diode D11. In the present embodiment, the diode D11 is provided as a regenerative diode for suppressing charging on the low potential side of the capacitor C10. In the present embodiment, the inductor L8 and the capacitor C10 constitute an LC filter circuit. Therefore, in the lighting device 10 according to the present embodiment, it is possible to remove noise generated by the switching element Q5. Note that, $I_G$ in FIG. 13 denotes a current flowing through the gate terminal of the switching element Q5, and $I_{Q5}$ in FIG. 13 denotes a current flowing between the anode and cathode terminals of the switching element Q5.

The switching circuit 26 is configured so that a current flowing through a series circuit (that is constituted by the current limiting element 28, the switching element Q5, the inductor L8, and resistors R21 and R22) is less than a current of maintaining an ON-state of the switching element Q5. Specifically, in the switching circuit 26, for example, when a first DC voltage by a boosting circuit 3 is 410 [V] and the current of maintaining the ON-state of the switching element Q5 is 1 [mA], resistance values of the current limiting element 28 (a resistor in the present embodiment) and the resistors R21 and R22 are set to satisfy the following formula: [410/{(a resistance value of the current limiting element 28)+(a resistance value of the resistor R21)+(a resistance value of the resistor R22)}]<1 [mA]. Here, if the value of the current limiting element 28 is set to a negligible extent, compared with a total of the resistance values of the resistors R21 and R22, the resistance values of the resistors R21 and R22 may be set to satisfy the following formula: {(the resistance value of the resistor R21)+(the resistance value of the resistor R22)}>410 [kΩ]. Hereinafter, operation of the lighting device 10 according to the present embodiment will be described with reference to FIG. 14. Note that, regarding operation similar to that according to the Fourth Embodiment, the explanation thereof is appropriately omitted.

When receiving an indication signal of indicating turning off of a light source portion 20 from a dimmer 12, a control circuit 6 changes, from a low level to a high level, an output level of a second control signal S2 to be transmitted to the step-down circuit 4 (at a time t21 in FIG. 14) to switch a switching element Q4 from an ON-state to an OFF-state.

In the lighting device 10, when the switching element Q4 is switched to the OFF-state, no current flows through a light-emitting diode PD1 of the photocoupler PC1, and accordingly, a voltage across a resistor R16 is reduced to a voltage less than a reference voltage, and then a second controlling IC 9 falls into a stopped state. Furthermore, in the lighting device 10, when the switching element Q4 is switched to the OFF-state, no current flows through the light-emitting diode PD1 of the photocoupler PC1, and accordingly, the phototransistor PT1 is switched from the ON-state to the OFF-state. Then, in the lighting device 10, when the phototransistor PT1 is switched to the OFF-state, the above-mentioned current $I_{ZD2}$ flows through the gate terminal of the switching element Q5.

Figure 14:
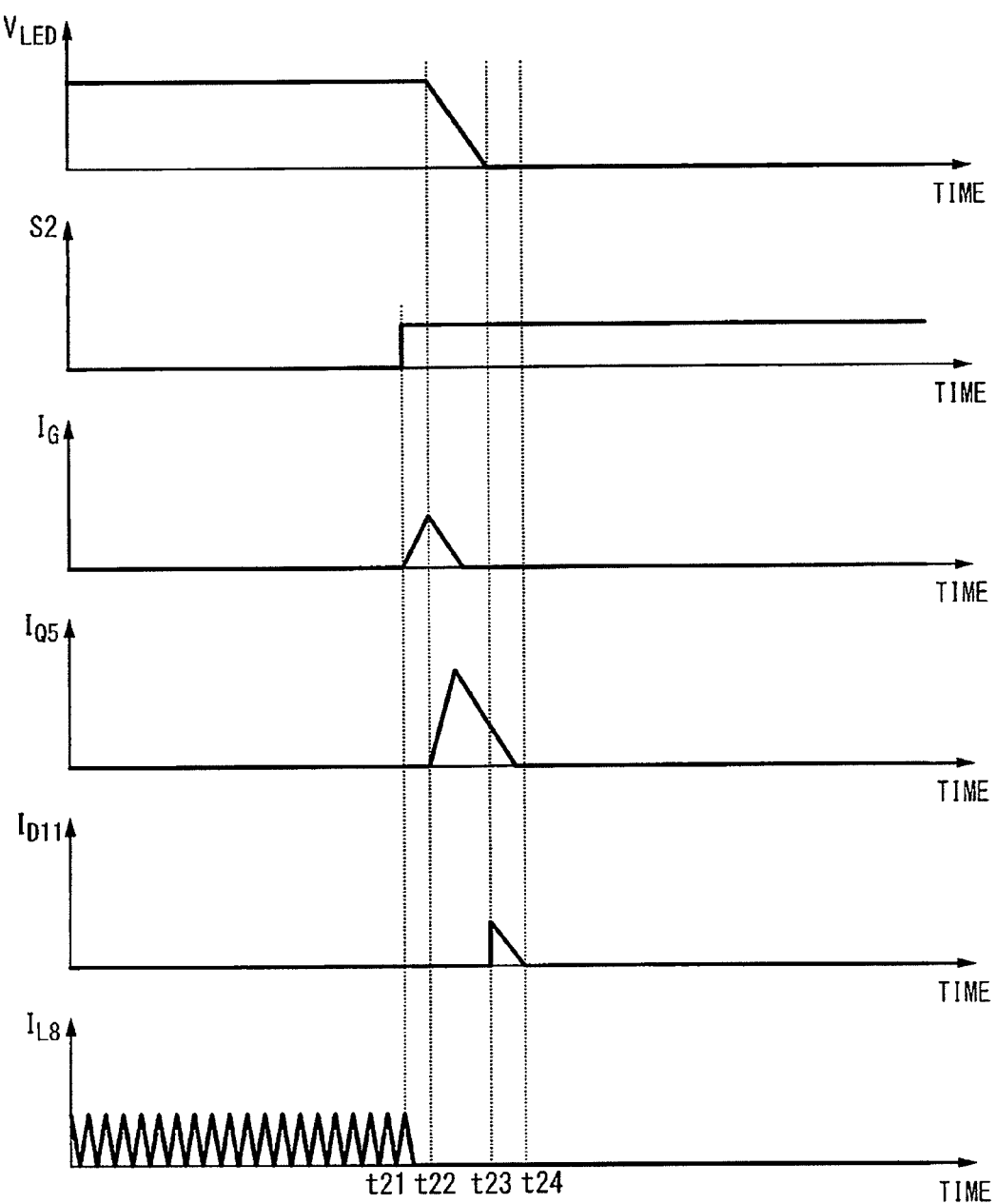
FIG. 14 is an explanatory drawing for operation when a light source portion is turned off, in the lighting device according to the Fifth Embodiment.

In the switching circuit 26, when the current $I_G$ flowing through the gate terminal of the switching element Q5 reaches the current of maintaining the ON-state of the switching element Q5, the switching element Q5 is switched from the OFF-state to the ON-state (at a time t22 in FIG. 14). In the switching circuit 26, when the switching element Q5 is switched to the ON-state, discharging of electric charge previously stored in the capacitor C10 is performed.

In the lighting device 10, when discharging of the electric charge previously stored in the capacitor C10 is performed, the current $I_{Q5}$ through the switching element Q5 flows to the inductor L8. In the lighting device 10, when a voltage $V_{LED}$ across the capacitor C10 is reduced to be less than a rated voltage of the light source portion 20, LED elements 21 of the light source portion 20 are turned off. In the lighting device 10, when discharging of the electric charge previously stored in the capacitor C10 is completed, counter electromotive force is generated at the inductor L8. In the lighting device 10, when the counter electromotive force is generated at the inductor L8, the current $I_{D11}$ flows through the diode D11 (at a time t23 in FIG. 14). In the lighting device 10, when the current $I_{Q5}$ through the switching element Q5 is reduced to be less than the current of maintaining the ON-state of the switching element Q5, the switching element Q5 is switched from the ON-state to the OFF-state. Note that, t24 in FIG. 14 denotes a time at which the current $I_{D11}$ through the diode D11 is reduced to zero.

In the lighting device 10 according to the present embodiment described above, the switching element Q5 is a thyristor. Therefore, in the lighting device 10 according to the present embodiment, even when the discharge current by the capacitor C10 is large, the switching element Q5 can be operated. Furthermore, in the lighting device 10 according to the present embodiment, it is possible to more increase capacitance of the smoothing capacitor C10, compared with a case where a power MOSFET is used as the switching element Q5.

Note that, the luminaire 30 according to the First Embodiment may include the lighting device 10 according to the present embodiment. In addition, the lighting device 10 according to the present embodiment may include the driving portion 18 in the lighting device 10 according to the Third Embodiment. Furthermore, the lighting device 10 according to the present embodiment may include the controlling portion 19 in the lighting device 10 according to the Fourth Embodiment.

Sixth Embodiment

Figure 15:
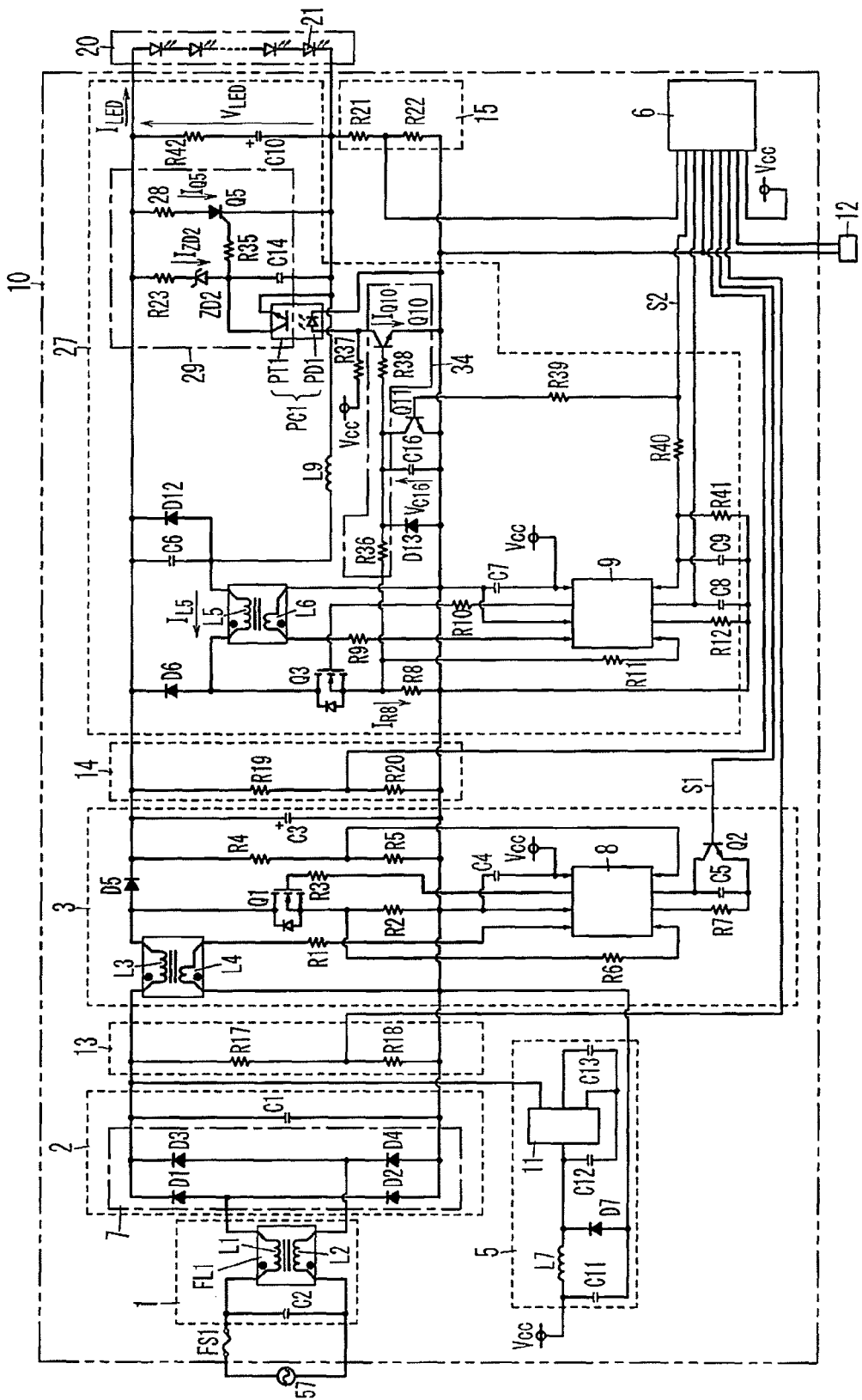
FIG. 15 is a circuit diagram illustrating a lighting device according to Sixth Embodiment.

A lighting device 10 according to the present embodiment has the same basic constituent elements as the First Embodiment. However, as shown in FIG. 15, the lighting device 10 according to the present embodiment is different from that according to the First Embodiment in that the lighting device 10 according to the present embodiment includes a step-down circuit 27 having a configuration different from that of the step-down circuit 4 in the First Embodiment. Note that, regarding the lighting device 10 according to the present embodiment, constituent elements similar to those of the First Embodiment are assigned with same reference numerals, and the explanations thereof are appropriately omitted.

The step-down circuit 27 includes three diodes D6, D12 and D13, three inductors L5, L6 and L9, five capacitors C6 to C9 and C16, twelve resistors R8 to R12 and R36 to R42, and three switching elements Q3, Q10 and Q11. The step-down circuit 27 further includes a second controlling IC 9 configured to control on/off of the switching element Q3, a light-emitting diode PD1 of a photocoupler PC1, and a capacitor C10. In the present embodiment, for example, a film capacitor is used as the capacitor C10. Note that, $V_{C16}$ in FIG. 15 denotes a voltage across the capacitor C16, and $V_{LED}$ in FIG. 15 denotes an output voltage of the step-down circuit 27, and $I_{LED}$ in FIG. 15 denotes an output current of the step-down circuit 27, and $I_{R8}$ in FIG. 15 denotes a current flowing through the resistor R8.

A high potential side of the capacitor C9 is connected with a first end of the resistor R40. A second end of the resistor R40 is connected with a control circuit 6. In addition, the capacitor C9 is connected in parallel with the resistor R41.

The switching element Q10 is an npn-type transistor, for example.

A first main terminal (a collector terminal in the present embodiment) of the switching element Q10 is connected with an anode side of the light-emitting diode PD1. In addition, the collector terminal of the switching element Q10 is connected with a first end of the resistor R37. A second end of the resistor R37 is connected with a high potential side of a capacitor C11 of a control power supply circuit 5.

A second main terminal (an emitter terminal in the present embodiment) of the switching element Q10 is connected with a cathode side of the light-emitting diode PD1. In addition, the emitter terminal of the switching element Q10 is connected with a low potential side of a capacitor C3. Note that, $I_{Q10}$ in FIG. 15 denotes a current flowing between the collector and emitter terminals of the switching element Q10.

The switching element Q11 is an npn-type transistor, for example.

A first main terminal (a collector terminal in the present embodiment) of the switching element Q11 is connected with a first end of the resistor R38. A second end of the resistor R38 is connected with a control terminal (a base terminal in the present embodiment) of the switching element Q10. In addition, the collector terminal of the switching element Q11 is connected with a high potential side of the capacitor C16. A low potential side of the capacitor C16 is connected with a second main terminal (an emitter terminal in the present embodiment) of the switching element Q11. The low potential side of the capacitor C16 is connected with an anode side of the diode D13. A cathode side of the diode D13 is connected with a high potential side of the capacitor C16. In addition, the cathode side of the diode D13 is connected with a first end of the resistor R36. A second end of the resistor R36 is connected with a connecting point of the resistor R8 and a source terminal of the switching element Q3. The anode side of the diode D13 is connected with the low potential side of the capacitor C3.

A control terminal (a base terminal in the present embodiment) of the switching element Q11 is connected with a first end of the resistor R39. A second end of the resistor R39 is connected with a connecting point of the resistor R40 and the control circuit 6.

A high potential side of the capacitor C6 is connected with a cathode side of the diode D12. A low potential side of the capacitor C6 is connected with an anode side of the diode D12. In addition, the low potential side of the capacitor C6 is connected with a first end of the inductor L9. A second end of the inductor L9 is connected with a low potential side of the capacitor C10. The cathode side of the diode D12 is connected with a first end of the resistor R42. A second end of the resistor R42 is connected with a high potential side of the capacitor C10.

When receiving a third DC voltage from the control power supply circuit 5, the control circuit 6 is configured to change an output level of a second control signal S2 to a low level to switch the switching element Q11 of the step-down circuit 27 to an OFF-state. Further, when receiving the third DC voltage from the control power supply circuit 5, the control circuit 6 is configured to change the output level of the second control signal S2 to the low level to switch the second controlling IC 9 to a stopped state.

In the lighting device 10 according to the present embodiment, a light source portion 20 is connected in parallel with a series circuit of the resistor R42 and the capacitor C10. In the lighting device 10, the resistors R36 and R38, and the switching element Q10 constitute an overcurrent detecting portion 34 configured to detect an overcurrent flowing through the low potential side of the capacitor C6 when a short-circuit failure occurs at the switching element Q3.

In the lighting device 10 according to the present embodiment, when the short-circuit failure occurs at the switching element Q3, the current through the switching element Q3 flows to the overcurrent detecting portion 34, and accordingly, the switching element Q10 is switched to an ON-state. In the lighting device 10, when the switching element Q10 is switched to an ON-state, a phototransistor PT1 is switched from an ON-state to an OFF-state. In the present embodiment, the resistor R36 and the capacitor C16 constitute an RC filter circuit. This RC filter circuit is configured to remove a high frequency component of the current through the switching element Q3.

In the lighting device 10 according to the present embodiment, the step-down circuit 27 is provided with a switching circuit 29. The switching circuit 29 includes a series circuit of a current limiting element 28 and a switching element Q5. The series circuit of the current limiting element 28 and switching element Q5 is connected in parallel with the series circuit of the resistor R42 and the capacitor C10. That is, the switching circuit 29 is connected in parallel with the light source portion 20.

The switching circuit 29 includes the current limiting element 28, the switching element Q5, a capacitor C14, a Zener diode ZD2, two resistors R23 and R35, and the phototransistor PT1 of the photocoupler PC1.

The switching element Q5 is a thyristor, for example.

A first main terminal (an anode terminal in the present embodiment) of the switching element Q5 is connected with a first end of the current limiting element 28. A second end of the current limiting element 28 is connected with the cathode side of the diode D12. A second main terminal (a cathode terminal in the present embodiment) of the switching element Q5 is connected with the low potential side of the capacitor C6. A control terminal (a gate terminal in the present embodiment) of the switching element Q5 is connected with a first end of a resistor R35. A second end of the resistor R35 is connected with a collector terminal of the phototransistor PT1. Note that, $I_{Q5}$ in FIG. 15 denotes a current flowing between the anode and cathode terminals of the switching element Q5.

A high potential side of the capacitor C14 is connected with a connecting point of the resistor R35 and the collector terminal of the phototransistor PT1. A low potential side of the capacitor C14 is connected with the low potential side of the capacitor C6. In addition, the high potential side of the capacitor C14 is connected with a cathode side of the Zener diode ZD2. An anode side of the Zener diode ZD2 is connected with a first end of the resistor R23. A second end of the resistor R23 is connected with the cathode side of the diode D12.

The switching circuit 29 is configured to control on/off of the switching element Q5 in response to on/off of the phototransistor PT1.

Hereinafter, operation of the lighting device 10 according to the present embodiment will be described with reference to FIG. 16. Note that, regarding operation similar to that according to the First Embodiment, the explanation thereof is appropriately omitted.

In the lighting device 10 according to the present embodiment, when an AC voltage is supplied from a commercial power source 57 through operation to the above-mentioned switch, the control power supply circuit 5 generates the third DC voltage with a DC voltage received from a DC power supply 2. The control power supply circuit 5 supplies the generated third DC voltage to each of a boosting circuit 3, the step-down circuit 27 and the control circuit 6.

When receiving the third DC voltage from the control power supply circuit 5, the step-down circuit 27 switches the phototransistor PT1 of the photocoupler PC1 from the OFF-state to the ON-state.

When it is determined that a voltage $V_{LED}$ across the capacitor C10 is equal to or less than a third defined voltage, the control circuit 6 changes, from the low level to the high level, the output level of the second control signal S2 to be transmitted to the step-down circuit 27 to operate the second controlling IC 9. In addition, when it is determined that the voltage $V_{LED}$ across the capacitor C10 is equal to or less than the third defined voltage, the control circuit 6 changes, from the low level to the high level, the output level of the second control signal S2 to be transmitted to the step-down circuit 27 to switch the switching element Q11 from an OFF-state to an ON-state.

In the lighting device 10, when the output voltage $V_{LED}$ of the step-down circuit 27 reaches a rated voltage of the light source portion 20, LED elements 21 of the light source portion 20 are turned on.

In the lighting device 10, when a short-circuit failure occurs at the switching element Q3 of the step-down circuit 27 in a lighting state of the light source portion 20 (at a time t25 in FIG. 16), the output voltage $V_{LED}$ of the step-down circuit 27 increases, and an overcurrent (an overload current) occurs.

When it is determined that the output voltage $V_{LED}$ of the step-down circuit 27 is equal to or more than a fourth defined voltage that is previously set, the control circuit 6 changes, from the high level to the low level, the output level of the second control signal S2 to be transmitted to the step-down circuit 27 to switch the second controlling IC 9 to the stopped state. In addition, when it is determined that the output voltage $V_{LED}$ of the step-down circuit 27 is equal to or more than the fourth defined voltage that is previously set, the control circuit 6 changes, from the high level to the low level, the output level of the second control signal S2 to be transmitted to the step-down circuit 27 to switch the switching element Q11 from the ON-state to the OFF-state.

Figure 16:
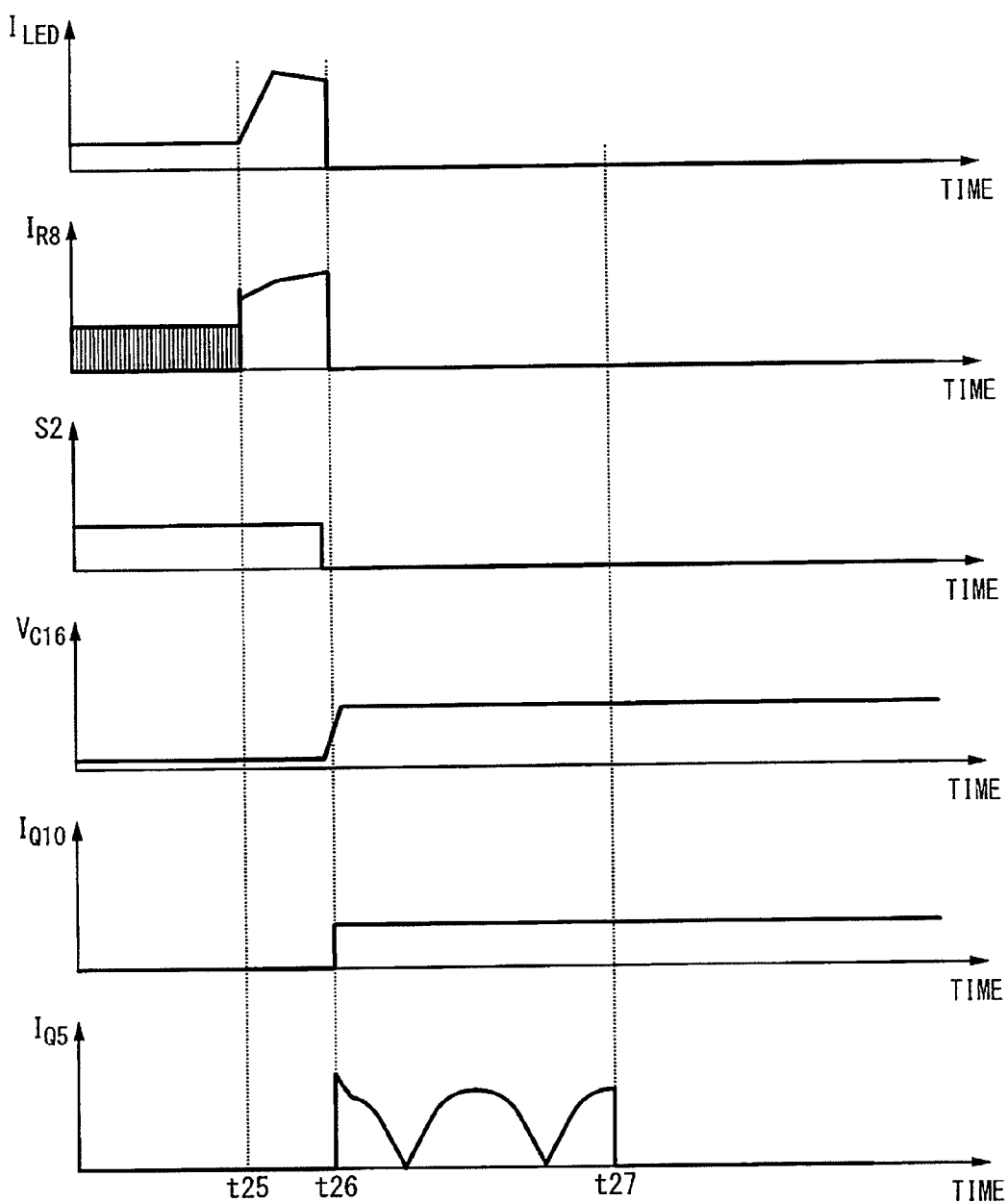
FIG. 16 is an explanatory drawing for operation when a short-circuit failure occurs, in the lighting device according to the Sixth Embodiment.

In the lighting device 10, when the switching element Q11 is switched to the OFF-state, the switching element Q10 is switched from an OFF-state to an ON-state (at a time t26 in FIG. 16). In the lighting device 10, when the switching element Q10 is switched to the ON-state, the phototransistor PT1 of the photocoupler PC1 is switched from the ON-state to the OFF-state.

In the step-down circuit 27, when the phototransistor PT1 is switched to the OFF-state, the above-mentioned current $I_{ZD2}$ flows through the gate terminal of the switching element Q5, and the switching element Q5 is switched from an OFF-state to an ON-state.

In the lighting device 10, the switching element Q5 of the switching circuit 29 is switched to the ON-state, an overcurrent that occurs at the step-down circuit 27 flows to the low potential side of the capacitor C6 via the current limiting element 28, the switching element Q5 and the inductor L9. In the lighting device 10, the overcurrent that has flowed to the low potential side of the capacitor C6 then flows through the inductor L5, the switching element Q3, the resistor R8, a diode D4, an inductor L2, the commercial power source 57, a fuse FS1, an inductor L1, a diode D1, an inductor L3, a diode D5, and the high potential side of the capacitor C6 in that order, and accordingly, the fuse FS1 is fused (at a time t27 in FIG. 16).

In the lighting device 10 according to the present embodiment, the inductor L9 and the capacitor C10 constitute an LC filter circuit. Therefore, in the lighting device 10 according to the present embodiment, it is possible to remove a high frequency component of the output current LED of the step-down circuit 27.

Furthermore, in the lighting device 10 according to the present embodiment, the resistor R42 can suppress resonance of the LC filter circuit constituted by the inductor L9 and the capacitor C10. Specifically, the resistor R42 reduces a Q-factor of the resonance of the LC filter circuit constituted by the inductor L9 and the capacitor C10. Note that, it is preferred that the Q-factor of the resonance of the LC filter circuit is 5 or less.

The lighting device 10 according to the present embodiment described above includes the step-down circuit 27 configured to convert an input voltage (first DC voltage) into a DC voltage (second DC voltage) by no insulation, and the control circuit 6 configured to control the step-down circuit 27. The step-down circuit 27 is provided on a side of an input end thereof with an overcurrent protector FS1. The overcurrent protector FS1 is configured to be fused by flowing of an overcurrent. The step-down circuit 27 has an output end, a side of which is connected in parallel with the switching circuit 29. The switching circuit 29 includes the switching element Q5. The control circuit 6 is configured to turn on the switching element Q5 according to the output voltage $V_{LED}$ of the step-down circuit 27 (a voltage between both ends of the series circuit of the resistor R42 and the capacitor C10). Therefore, in the lighting device 10 according to the present embodiment, it is possible to prevent the light source portion 20 from falling into an overloaded state.

In the lighting device 10 according to the present embodiment, the switching circuit 29 further includes the current limiting element 28. The current limiting element 28 is connected in series with the switching element Q5. Therefore, in the lighting device 10 according to the present embodiment, it is possible to prevent a magnitude of an overcurrent through the fuse FS1 from exceeding a magnitude of a rated breaking current of the fuse FS1.

In the lighting device 10 according to the present embodiment, when it is determined that the output voltage $V_{LED}$ of the step-down circuit 27 is equal to or more than the fourth defined voltage that is previously set, the control circuit 6 changes, from the high level to the low level, the output level of the second control signal S2 to be transmitted to the step-down circuit 27 to operate the switching circuit 29. Therefore, in the lighting device 10 according to the present embodiment, it is possible to operate the switching circuit 29 only when a short-circuit failure occurs at the switching element Q3 of the step-down circuit 27, and accordingly, it is possible to reduce a stress to be applied to the switching circuit 29.

In the lighting device 10 according to the present embodiment, the step-down circuit 27 is further provided with the overcurrent detecting portion 34 that is configured to detect the overcurrent. The step-down circuit 27 is configured to turn on the switching element Q5 when the overcurrent is detected by the overcurrent detecting portion 34. Therefore, in the lighting device 10 according to the present embodiment, it is possible to operate the switching circuit 29 only when a short-circuit failure occurs at the switching element Q3.

Note that, the luminaire 30 according to the First Embodiment may include the lighting device 10 according to the present embodiment. In addition, the lighting device 10 according to the present embodiment may include the driving portion 18 in the lighting device 10 according to the Third Embodiment. Furthermore, the lighting device 10 according to the present embodiment may include the controlling portion 19 in the lighting device 10 according to the Fourth Embodiment.

Although the present invention has been described with reference to certain preferred embodiments, numerous modifications and variations can be made by those skilled in the art without departing from the true spirit and scope of this invention, namely claims.

The invention claimed is:

1. A lighting device, comprising:
 a step-down circuit configured to convert an input voltage into a DC voltage by no insulation; and
 a control circuit configured to control the step-down circuit,
 wherein the step-down circuit has an input end, the step-down circuit being provided on a side of the input end with an overcurrent protector,
 the overcurrent protector being configured to be fused by flowing of an overcurrent,
 wherein the step-down circuit has an output end, a side of which is connected in parallel with a switching circuit, the switching circuit comprising a switching element, and
 wherein the control circuit is configured to turn on the switching element according to an output voltage of the step-down circuit.

2. The lighting device according to claim 1, wherein the switching circuit further comprises a current limiting element,
 the current limiting element being connected in series with the switching element.

3. The lighting device according to claim 2, wherein the current limiting element is an NTC thermistor.

4. The lighting device according to claim 1, wherein the switching element is a thyristor.

5. The lighting device according to claim 1, wherein a relationship of "$V_{in}/V_{out} > 0.5$" is satisfied, where $V_{in}$ denotes an effective value of a voltage input to the lighting device, and $V_{out}$ denotes the output voltage of the step-down circuit.

6. The lighting device according to claim 1, wherein the control circuit is configured to turn on the switching element when the step-down circuit is in a stopped state.

7. The lighting device according to claim 1, wherein the step-down circuit is further provided with a driving portion that is configured to turn on the switching element when the output voltage of the step-down circuit reaches a first prescribed voltage that is previously set.

8. The lighting device according to claim 1, wherein the step-down circuit is further provided with a controlling portion that is configured not to allow operation of the switching circuit when the input voltage of the step-down circuit is equal to or less than a second prescribed voltage that is previously set.

9. The lighting device according to claim 1, wherein the step-down circuit is further provided with an overcurrent detecting portion that is configured to detect the overcurrent,
 the step-down circuit being configured to turn on the switching element when the overcurrent is detected by the overcurrent detecting portion.

10. An LED luminaire, comprising a light source portion with an LED element, and the lighting device according to claim 1.

11. An organic EL luminaire, comprising a light source portion with an organic EL element, and the lighting device according to claim 1.

* * * * *